(12) United States Patent
Stoner

(10) Patent No.: US 10,604,053 B2
(45) Date of Patent: Mar. 31, 2020

(54) CONVERTIBLE STORAGE TRAY AND GARBAGE BAG HOLDER AND METHOD OF USING THE SAME TO COLLECT GARBAGE OR HOLD AN ITEM

(71) Applicant: Ford Global Technologies, LLC, Dearborn, MI (US)

(72) Inventor: Kenneth Alan Stoner, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 15/997,942

(22) Filed: Jun. 5, 2018

(65) Prior Publication Data

US 2019/0366901 A1 Dec. 5, 2019

(51) Int. Cl.
| B60N 3/08 | (2006.01) |
| B60N 3/00 | (2006.01) |
| B65F 1/14 | (2006.01) |
| B60R 11/00 | (2006.01) |

(52) U.S. Cl.
CPC .............. *B60N 3/08* (2013.01); *B60N 3/002* (2013.01); *B65F 1/1415* (2013.01); *B60R 2011/0007* (2013.01)

(58) Field of Classification Search
CPC ......... B65F 1/1415; B60N 3/08; B60N 3/002; B60R 2011/0007
USPC ........ 220/570; 248/301, 304, 323, 324, 339; 224/548, 550, 553, 928
See application file for complete search history.

(56) References Cited

U.S. PATENT DOCUMENTS

| 2,817,476 | A | | 12/1957 | Mills, Jr. | |
| 3,964,630 | A | * | 6/1976 | Getz | B65F 1/06 220/4.01 |
| 5,419,453 | A | | 5/1995 | Lochridge | |
| 5,836,553 | A | * | 11/1998 | Bergaila | B65B 67/1233 248/99 |
| 7,770,952 | B2 | | 8/2010 | Hanzel | |
| 8,651,292 | B2 | | 2/2014 | Sunderland et al. | |
| 2007/0045326 | A1 | | 3/2007 | Tramontina et al. | |
| 2012/0087600 | A1 | | 4/2012 | Bahojbalmasi | |
| 2012/0181282 | A1 | * | 7/2012 | Heller | B65D 25/16 220/495.08 |
| 2017/0121104 | A1 | * | 5/2017 | Degnan | B65F 1/1415 |

* cited by examiner

*Primary Examiner* — Stephen J Castellano
(74) *Attorney, Agent, or Firm* — David Coppiellie; Price Heneveld LLP

(57) ABSTRACT

A convertible storage tray and garbage bag holder comprises: a housing including an interior chamber surrounded by one or more side walls, the interior chamber having an opening into the interior chamber and an exit out of the interior chamber; a releasable floor operably connected to the housing and having a closed position blocking the exit out of the interior chamber of the housing and an opened position not blocking the exit out of the interior chamber of the housing; and a bag retention frame operably connected to the housing and having an engaged position relative to the housing and a disengaged position relative to the housing wherein at least a portion of the bag retention frame is disposed further away from the housing than in the engaged position. The bag retention frame can be pivotally connected to the housing.

20 Claims, 24 Drawing Sheets

CONVERTIBLE STORAGE TRAY AND GARBAGE BAG HOLDER AND METHOD OF USING THE SAME TO COLLECT GARBAGE OR HOLD AN ITEM

FIELD OF THE INVENTION

The present invention generally relates to an accessory for the interior of a vehicle that can be utilized to selectively store items or collect garbage.

BACKGROUND OF THE INVENTION

A vehicle occupant sometimes produces garbage during use of the vehicle. The vehicle typically does not include an apparatus to collect the garbage prior to ultimate disposal.

SUMMARY OF THE INVENTION

According to one aspect of the present invention, a tray for an interior of a vehicle comprises: a housing including an interior chamber surrounded by one or more side walls, the interior chamber having an opening into the chamber and an exit out of the interior chamber; and a releasable floor operably connected to the housing and having a closed position and an opened position; wherein, in the closed position, the releasable floor blocks the exit out of the interior chamber of the housing; and wherein, in the open position, the releasable floor does not block the exit out of the interior chamber of the housing.

Embodiments of the first aspect of the invention can include any one or a combination of the following features:
  the releasable floor is pivotally connected to the housing; and
  an outwardly extending lip on opposing sides of the housing.

According to a second aspect of the present invention, a convertible storage tray and garbage bag holder comprises: a housing including an interior chamber surrounded by one or more side walls, the interior chamber having an opening into the chamber and an exit out of the interior chamber; a releasable floor operably connected to the housing and having a closed position blocking the exit out of the interior chamber of the housing and an opened position not blocking the exit out of the interior chamber of the housing; and a bag retention frame operably connected to the housing and having an engaged position relative to the housing and a disengaged position relative to the housing wherein at least a portion of the bag retention frame is disposed further away from the housing than in the engaged position.

Embodiments of the second aspect of the invention can include any one or a combination of the following features:
  the bag retention frame is pivotally connected to the housing;
  the interior chamber of the housing having an axis extending through the opening and the exit;
  at least a portion of the one or more side walls of the housing includes a top section including an inward facing surface, a middle section including an inward facing surface that is closer to the axis than the inward facing surface of the top section, and a ridge transitioning the inward facing surface of the top section to the inward facing surface of the middle section;
  the bag retention frame includes an outward facing surface that faces the inward facing surface of the top section of the one or more side walls of the housing when bag retention frame is in the engaged position;
  either the outward facing surface of the bag retention frame includes outwardly extending projections, or the inwardly facing surface of the top section of the one or more side walls of the housing includes inwardly extending projections, or both;
  the bag retention frame including a lip that extends over, and outwardly relative to, the top section of the one or more side walls of the housing, when the bag retention frame is in the engaged position;
  the releasable floor is pivotally connected to the housing about a floor axis;
  the bag retention frame is pivotally connected to the housing about a frame axis, and the frame axis is orthogonal to the floor axis;
  one or more hooks operably connected to the housing, the one or more hooks each including a first position, and a second position, wherein, in the second position the hook portion of the one or more hooks is disposed further away from the housing than in the first position;
  the one or more hooks pivotally connected to the housing about a hook axis that is parallel to the floor axis;
  the extension portion of the one or more hooks including a surface that faces the housing when the one or more hooks is in the first position;
  the hook portion of the one or more hooks including a surface that faces the releasable floor when the one or more hooks is in the first position; and
  a garbage bag including an interior portion disposed within the interior chamber of the housing and extending out of the exit of the interior chamber, with the releasable floor in the opened position, and an open top portion forming an opening into the interior portion, at least a portion of the open top portion is disposed between the bag retention frame and the housing when the bag retention frame is in the engaged position.

According to a third aspect of the present invention, a method of collecting garbage in a vehicle comprises: presenting a convertible storage tray and garbage bag holder including: a housing including an interior chamber surrounded by one or more side walls, the interior chamber having an opening into the chamber and an exit out of the interior chamber; a releasable floor operably connected to the housing and having a closed position blocking the exit out of the interior chamber of the housing and an opened position not blocking the exit out of the interior chamber of the housing; and a bag retention frame operably connected to the housing and having an engaged position relative to the housing and a disengaged position relative to the housing wherein at least a portion of the bag retention frame is disposed further away from the housing than in the engaged position; presenting a garbage bag including: an interior portion; and an open top portion forming an opening into the interior portion; moving the releasable floor to the opened position, if the releasable floor is not in the opened position; moving the bag retention frame to the disengaged position, if the bag retention frame is not in the disengaged position; disposing the garbage bag within the interior chamber of the housing such that the interior chamber of the housing surrounds at least a portion of the interior portion of the garbage bag; moving the bag retention frame to the engaged position and thereby trapping at least a portion of the open top portion of the garbage bag between the bag retention frame and the housing; and placing garbage within the interior portion of the garbage bag.

Embodiments of the third aspect of the invention can include any one or a combination of the following features:

moving one or more hooks operably connected to the housing of the convertible storage tray and garbage bag holder to a second position wherein a hook portion of the one or more hooks is disposed further away from the housing than in a first position, and placing the one or more hooks over an interior feature of the vehicle;

moving the bag retention frame to the disengaged position;

removing the garbage bag;

moving the bag retention frame to the engaged position;

moving the releasable floor to the closed position;

placing the convertible storage tray and garbage bag holder into an interior console of the vehicle;

retaining an item in the interior chamber of the housing;

the bag retention frame further comprises a lip that extends over, and outwardly relative to, the one or more side walls of the housing, when the bag retention frame is in the engaged position;

the interior console of the vehicle comprises opposing shelves;

placing the convertible storage tray and garbage bag holder into the interior console of the vehicle includes setting the lip of the bag retention frame upon the opposing shelves of the interior console;

the interior chamber of the housing of the convertible storage tray and garbage bag holder has an axis extending through the opening and the exit;

at least a portion of the one or more side walls of the housing includes a top section including an inward facing surface, a middle section including an inward facing surface that is closer to the axis than the inward facing surface of the top section, and a ridge transitioning the inward facing surface of the top section to the inward facing surface of the middle section;

the bag retention frame includes an outward facing surface that faces the inward facing surface of the top section of the one or more side walls of the housing when the bag retention frame is in the engaged position;

moving the bag retention frame to the engaged position and thereby trapping at least a portion of the open top portion of the garbage bag between the bag retention frame and the housing includes trapping at least a portion of the open top portion of the garbage bag between the outward facing surface of the bag retention frame and the inward facing surface of the top section of the one or more side walls of the housing;

moving a hook of the one or more hooks to the second position;

trapping an empty garbage bag between the hook and the housing while moving the hook toward the first position, before placing the convertible storage tray and garbage bag holder into the interior console of the vehicle;

the interior console of the vehicle includes one or more slots disposed beneath a top wall;

the one or more hooks of the convertible storage tray and garbage bag holder each include an extension portion extending away from the operable connection to the housing to a hook portion;

placing the convertible storage tray and garbage bag holder into the interior console of the vehicle includes inserting the hook portion of each of the one or more hooks into a slot of the one or more slots such that the top wall of the interior console is disposed between the one or more hooks and the releasable floor;

the interior feature of the vehicle is a cup holder with a vertical side wall adjacent a cup chamber; and the hook portion extends into the cup holder and the extension portion extends over the vertical side wall of the cup holder.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be understood that the specific devices and methods illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 24:
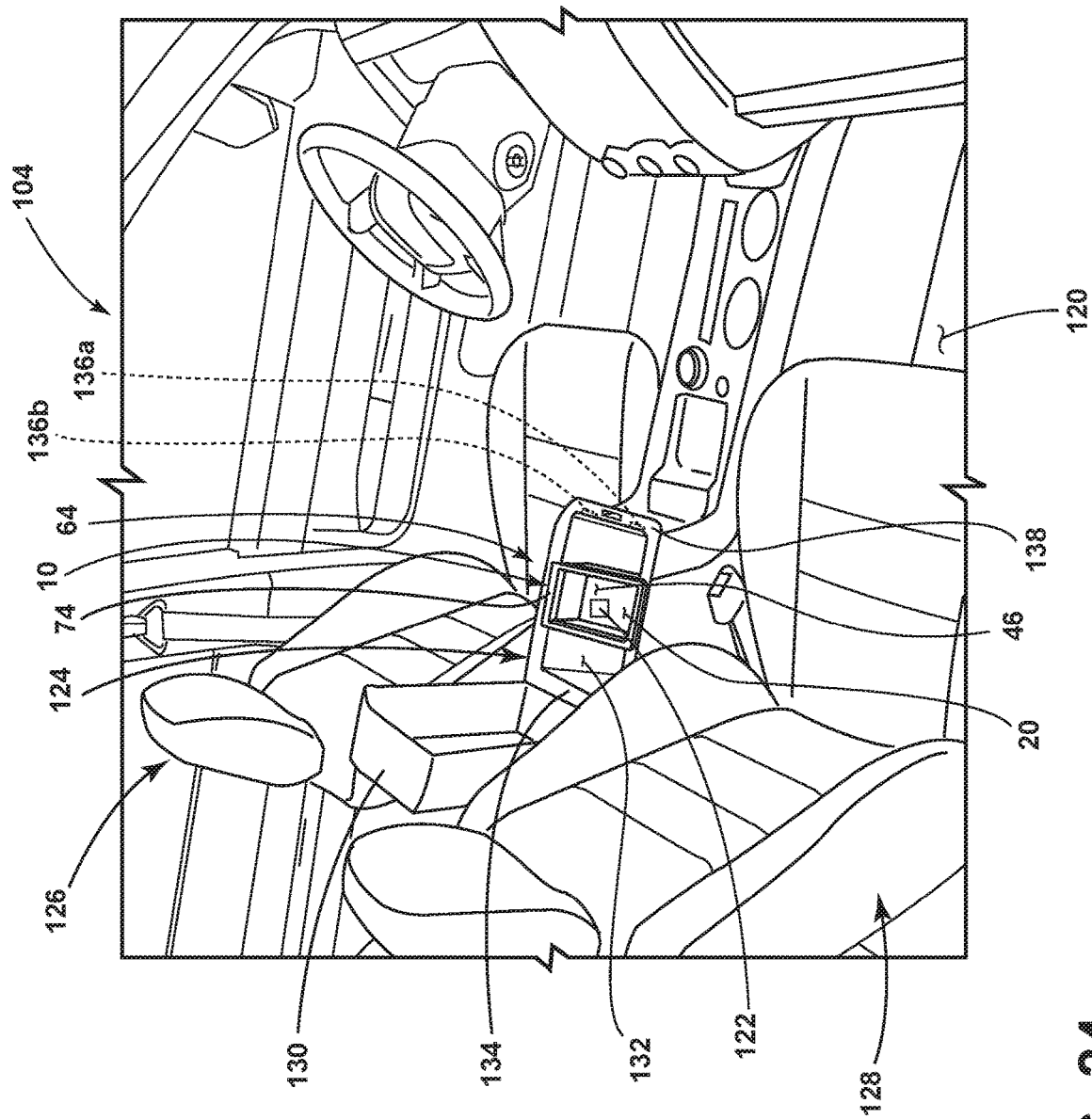
FIG. 24 is a perspective view of the convertible storage tray and garbage bag holder of FIG. 1, with the releasable tray in the closed position, setting upon opposing shelves of an interior console and retaining an item within the housing.
Figure 25:
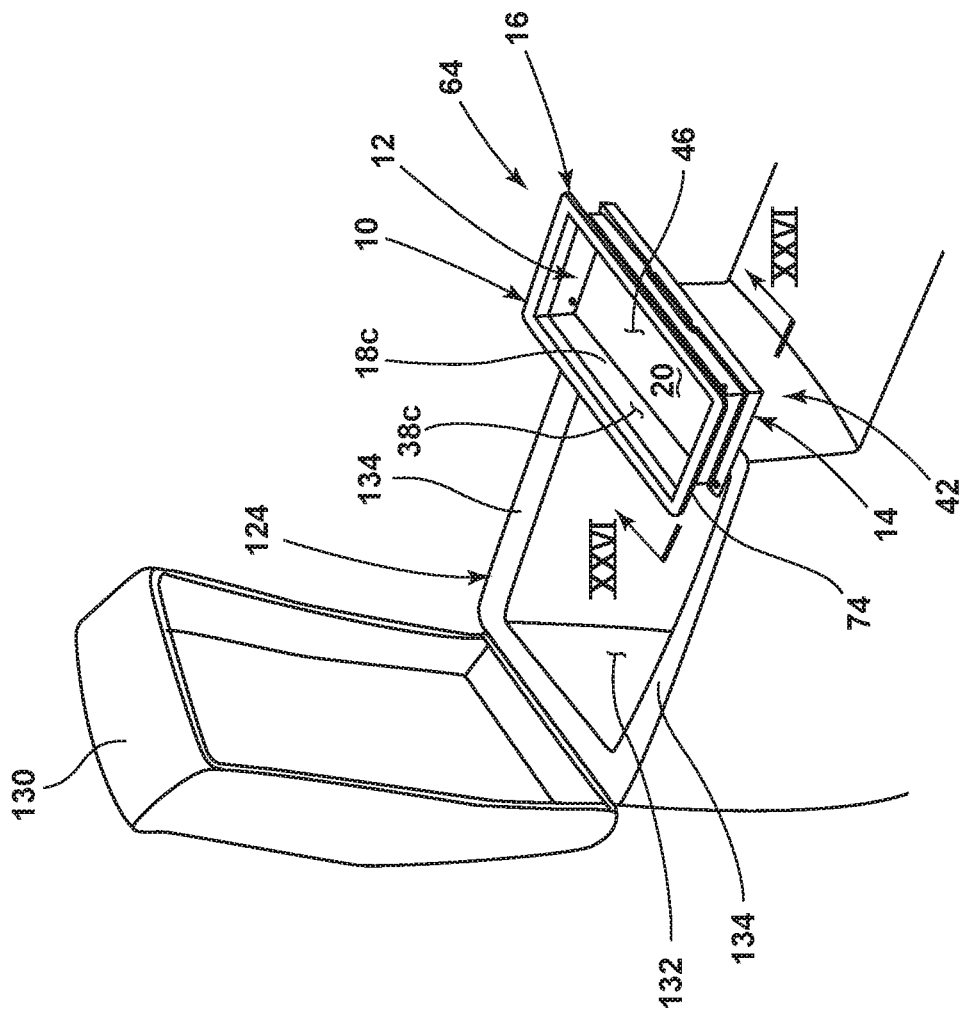
FIG. 25 is a perspective view of the convertible storage tray and garbage bag holder of FIG. 1 propped above a top wall of the interior console of FIG. 24.
Figure 26:
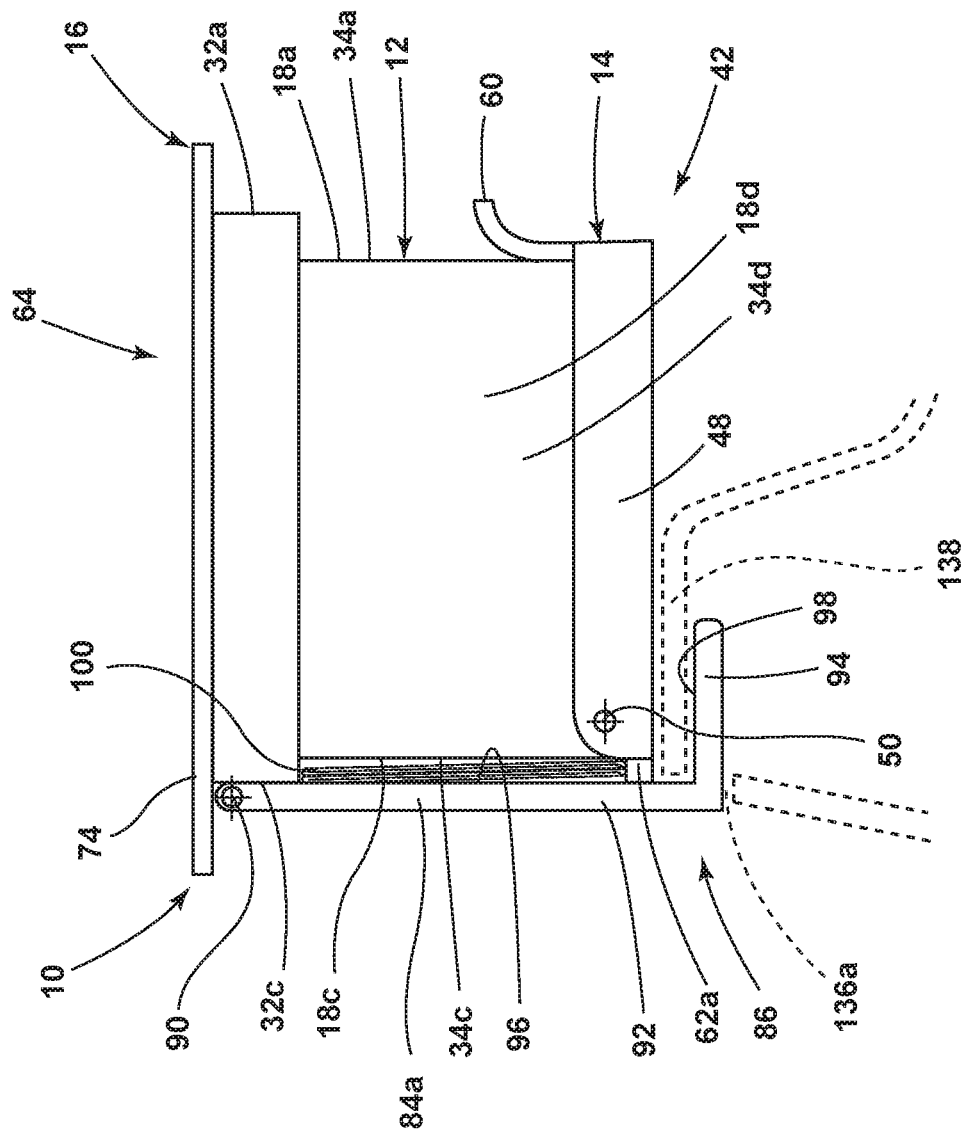
FIG. 26 is a side view of the convertible storage tray and garbage bag holder and interior console taken along cross-section XXVI-XXVI of FIG. 25, illustrating the hook portion of one of the hooks of the convertible storage tray and garbage bag holder inserted into a slot below the top wall of the interior console so that the top wall is disposed between the hook portion and the releasable floor.

For purposes of description herein, the terms "forward," "rearward," "beneath" and derivatives thereof shall relate to the invention as oriented in FIG. 24. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
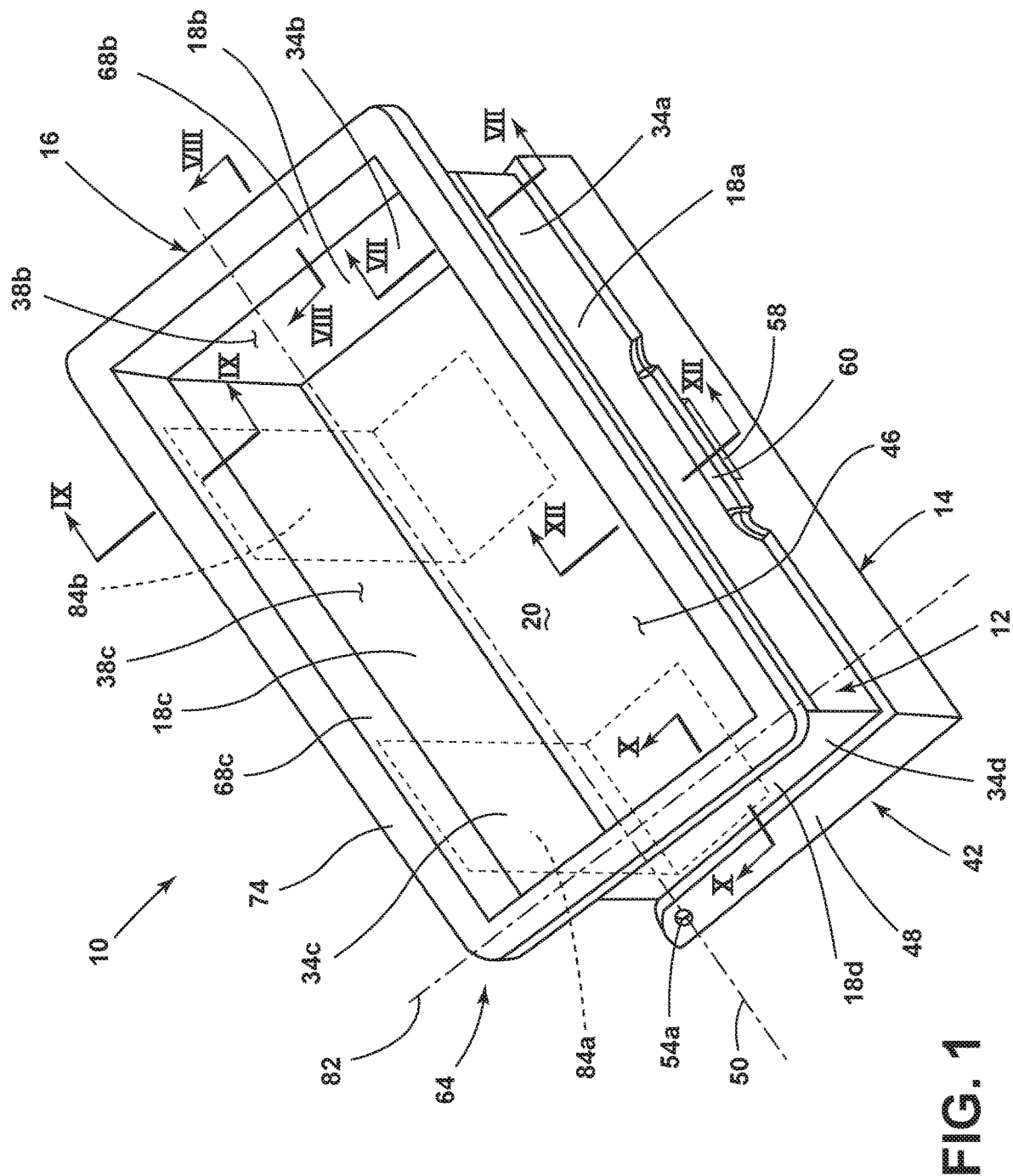
FIG. 1 is a perspective view of an embodiment of a convertible storage tray and garbage bag holder of the disclosure, illustrating a housing, a releasable floor operably connected to the housing, and a bag retention frame operably connected to the housing.

Referring to FIG. 1, a convertible storage tray and garbage bag holder 10 includes a housing 12, a releasable floor 14 operably connected to the housing 12, and a bag retention frame 16 operably connected to the housing 12. The housing 12 provides a coupling opportunity for both the bag retention frame 16 and the releasable floor 14.

Figure 2:
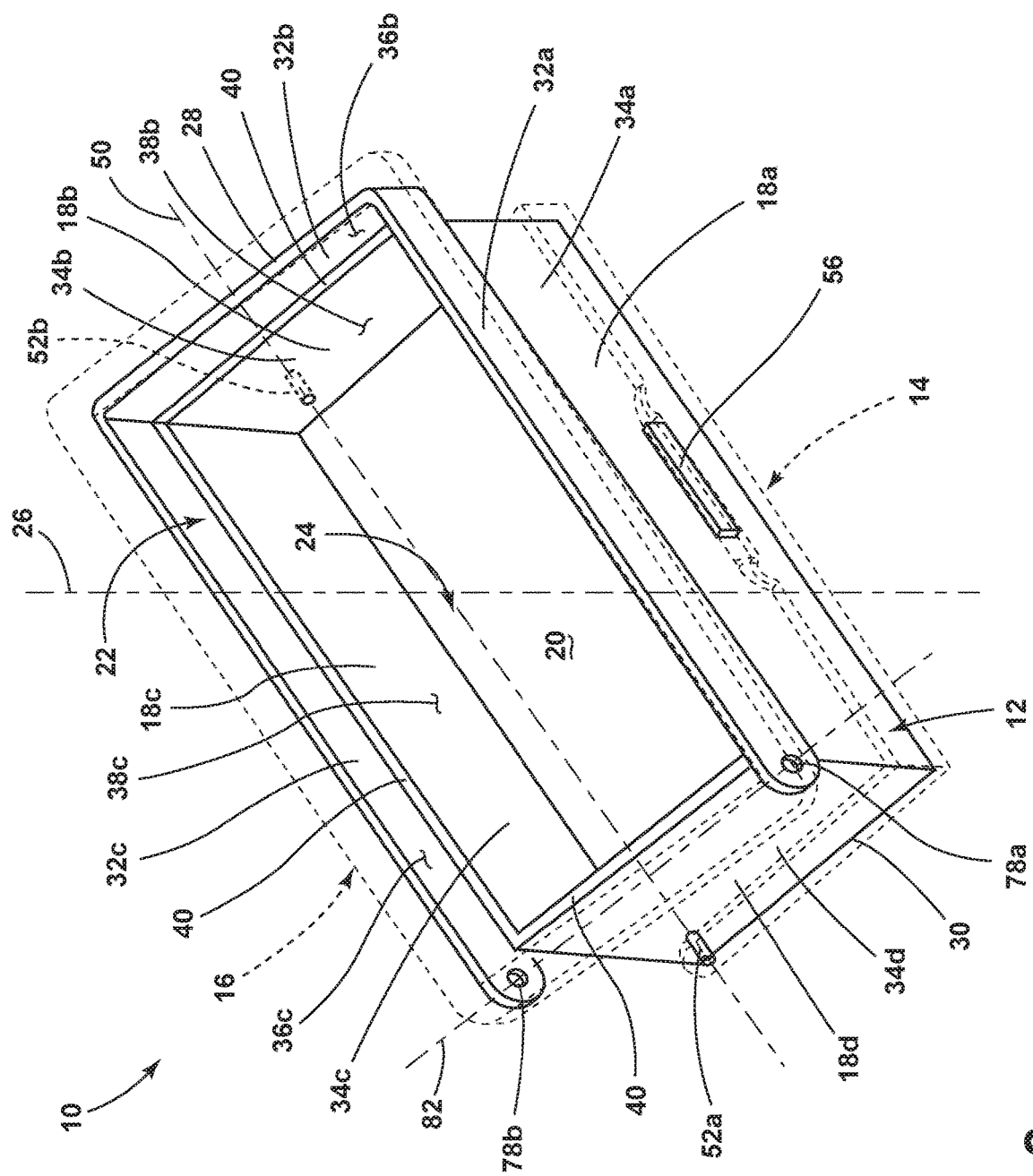
FIG. 2 is a perspective view of the convertible storage tray and garbage bag holder of FIG. 1, illustrating the housing including side walls and an interior chamber, with the releasable floor and bag retention frame shown in phantom.

Referring additionally to FIG. 2, the housing 12 includes one or more side walls 18 (18a-18d in the illustrated embodiment) surrounding an interior chamber 20. For example, in the illustrated embodiment, the housing 12 includes four side walls 18a-18d. In other embodiments, more or less side walls 18 may be utilized, such as one contiguous circular, conical, oval side wall. The interior chamber 20 has an opening 22 into the interior chamber 20, an exit 24 out of the interior chamber 20, and an axis 26 extending through the interior chamber 20 including the opening 22 and the exit 24 thereof. The axis 26 represents the center line of the interior chamber 20. A top edge 28 of the housing 12, which need not be contiguous, can define the opening 22 into the interior chamber 20. Similarly, a bottom edge 30 of the housing 12, which need not be contiguous, can define the exit 24 out of the interior chamber 20.

Figure 8:
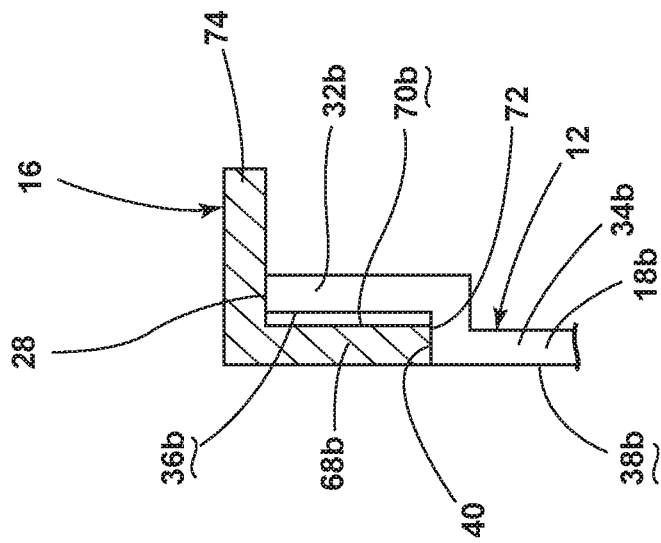
FIG. 8 is a side view of the convertible storage tray and garbage bag holder taken through cross section VIII-VIII of FIG. 1, illustrating an inward facing surface of the bag retention frame facing an outward facing surface of the housing, while the bag retention frame is in the engaged position with the housing.
Figure 7:
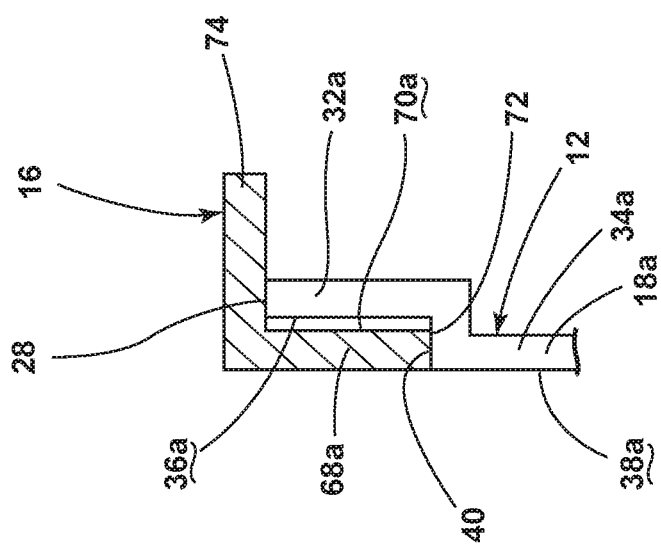
FIG. 7 is a side view of the convertible storage tray and garbage bag holder taken through cross section VII-VII of FIG. 1, illustrating an inward facing surface of the bag retention frame facing an outward facing surface of the housing, while the bag retention frame is in the engaged position with the housing.
Figure 10:
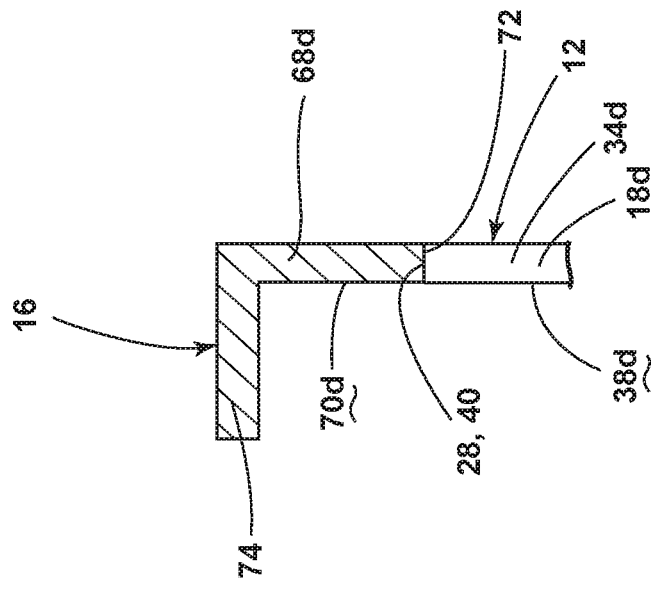
FIG. 10 is a side view of the convertible storage tray and garbage bag holder taken through cross section X-X of FIG. 1, illustrating a bottom edge of the bag retention frame facing a ridge of the housing, while the bag retention frame is in the engaged position with the housing.
Figure 9:
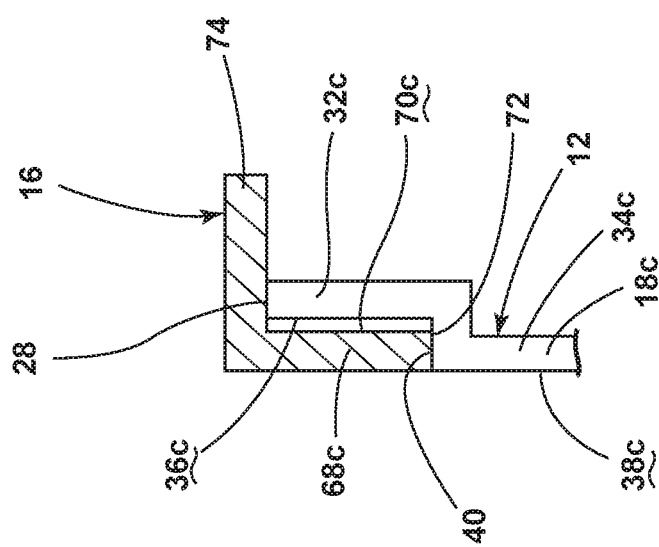
FIG. 9 is a side view of the convertible storage tray and garbage bag holder taken through cross section IX-IX of FIG. 1, illustrating an inward facing surface of the bag retention frame facing an outward facing surface of the housing, while the bag retention frame is in the engaged position with the housing.
Figure 11:
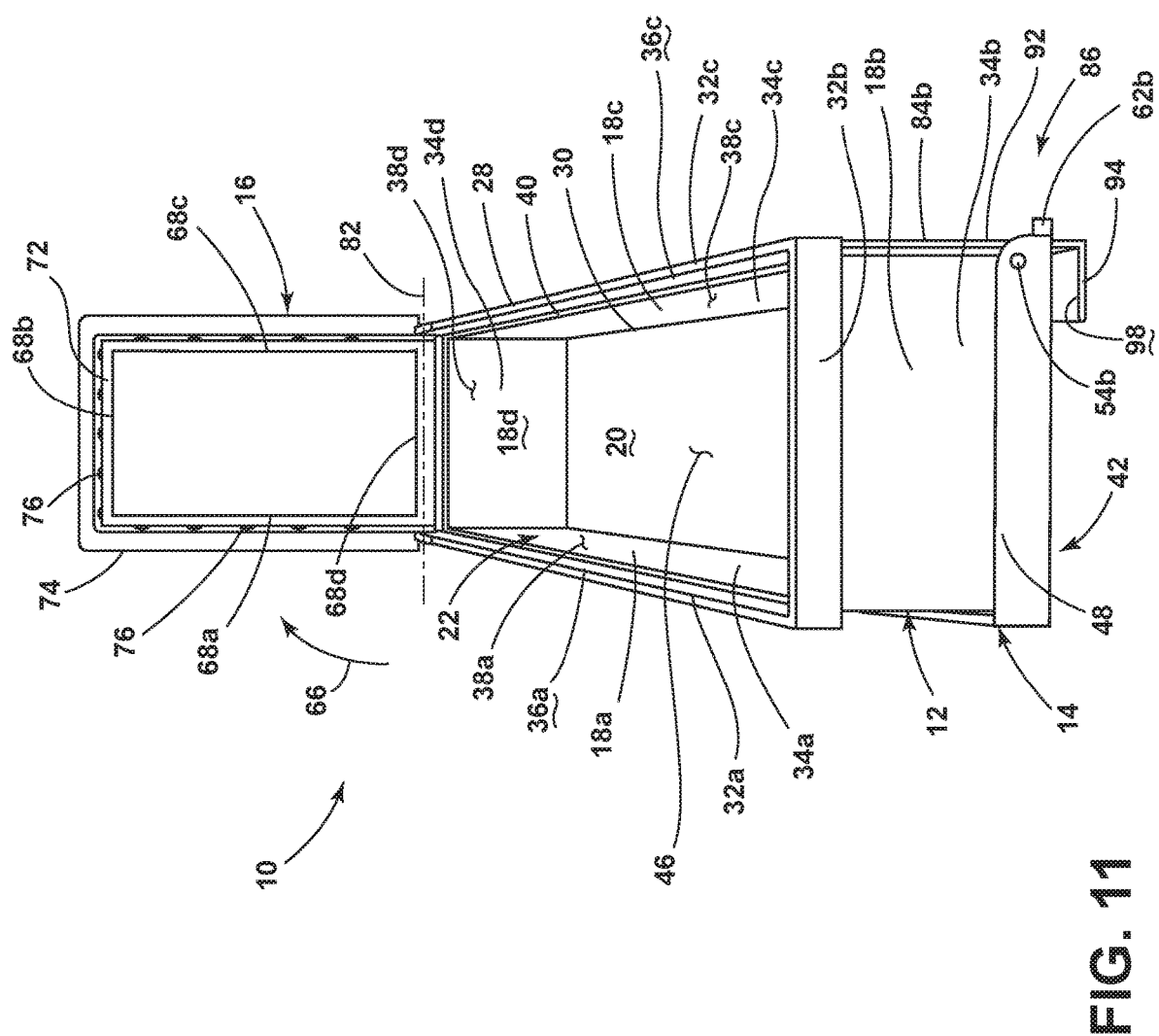
FIG. 11 is a side view of the convertible storage tray and garbage bag holder of FIG. 1, illustrating the bag retention frame in the disengaged position and projections extending from the walls of the bag retention frame.
Figure 12:
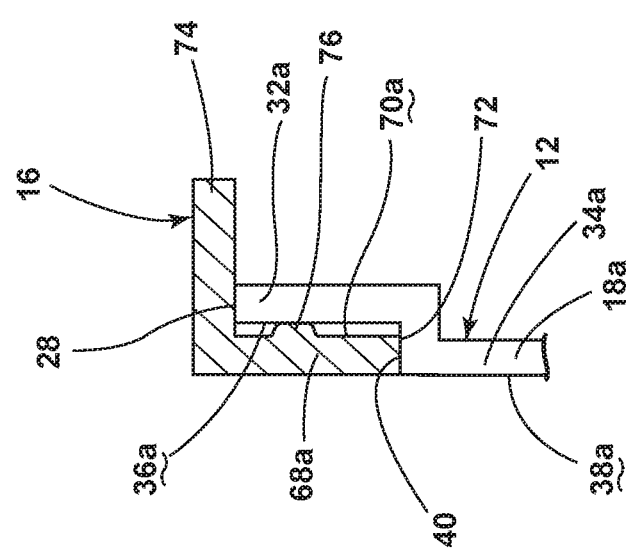
FIG. 12 is a side view of the convertible storage tray and garbage bag holder taken through cross section XII-XII of FIG. 1, illustrating the projections of the bag retention frame facing the outward facing surface of the housing, while the bag retention frame is in the engaged position with the housing.
Figure 13:
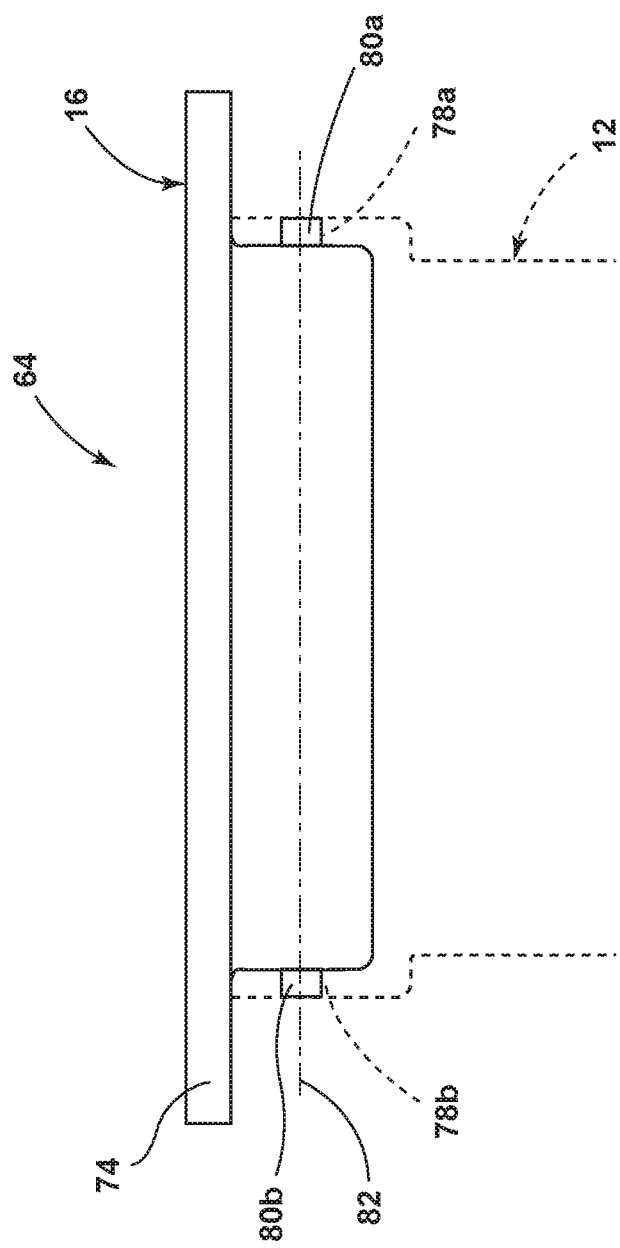
FIG. 13 is an elevational view of the convertible storage tray and garbage bag holder of FIG. 1, illustrating pivot pins of the bag retention frame extending into matching apertures of the housing to pivotally connect the bag retention frame to the housing.

At least a portion of the one or more side walls 18 (e.g., 18a-18c) of the housing 12 can be divided into (and thus include) a top section 32 (e.g., 32a-32c, respectively) and a middle section 34 (e.g., 34a-d, respectively). For example, in the illustrated embodiment, the side wall 18a includes the top section 32a and the middle section 34a, the side wall 18b includes the top section 32b and the middle section 34b, and the side wall 18c includes the top section 32c and the middle section 34c. The side wall 18d does not include the top section 32 but includes the middle section 34d. Each top section 32 (e.g., 32a-c) includes an inward facing surface 36 (e.g., 36a-c, respectively) (see also FIGS. 7-9). For example, the top section 32a includes the inward facing surface 36a, the top section 32b includes the inward facing surface 36b, and the top section 32c includes the inward facing surface 36c. In addition, each middle section 34 (e.g., 34a-d) likewise includes an inward facing surface 38 (e.g., 38a-d, respectively). For example, the middle section 34a includes the inward facing surface 38a, the middle section 34b includes the inward facing surface 38b, the middle section 34c includes the inward facing surface 38c, and the middle section 34d includes the inward facing surface 38d. The inward facing surfaces 38a-c of the middle sections 34a-c, respectively, are closer to the axis 26 than the inward facing surfaces 36a-c of the top sections 32a-c, respectively. For example, for the side wall 18a, the inward facing surface 38a of the middle section 34a is closer to the axis 26 than the inward facing surface 36a of the top section 32a, and so on for the side walls 18b and 18c. A ridge 40 transitions the inward facing surfaces 36a-c of the top sections 32a-c to the inward facing surfaces 38a-c of the middle sections 34a-c, respectively. For example, the ridge 40 forms the transition between the inward facing surface 36a and the inward facing surface 38a for the side wall 18a, and so on for the side walls 18b and 18c. In the illustrated embodiment, the top edge 28 of the housing 12 at the side wall 18d is the ridge 40. As further described below, the ridge 40 and the inward facing surfaces 36a-c of the top sections 32a-c, respectively, provide a seat for the bag retention frame 16 when the bag retention frame 16 is engaged with the housing 12.

Figure 3:
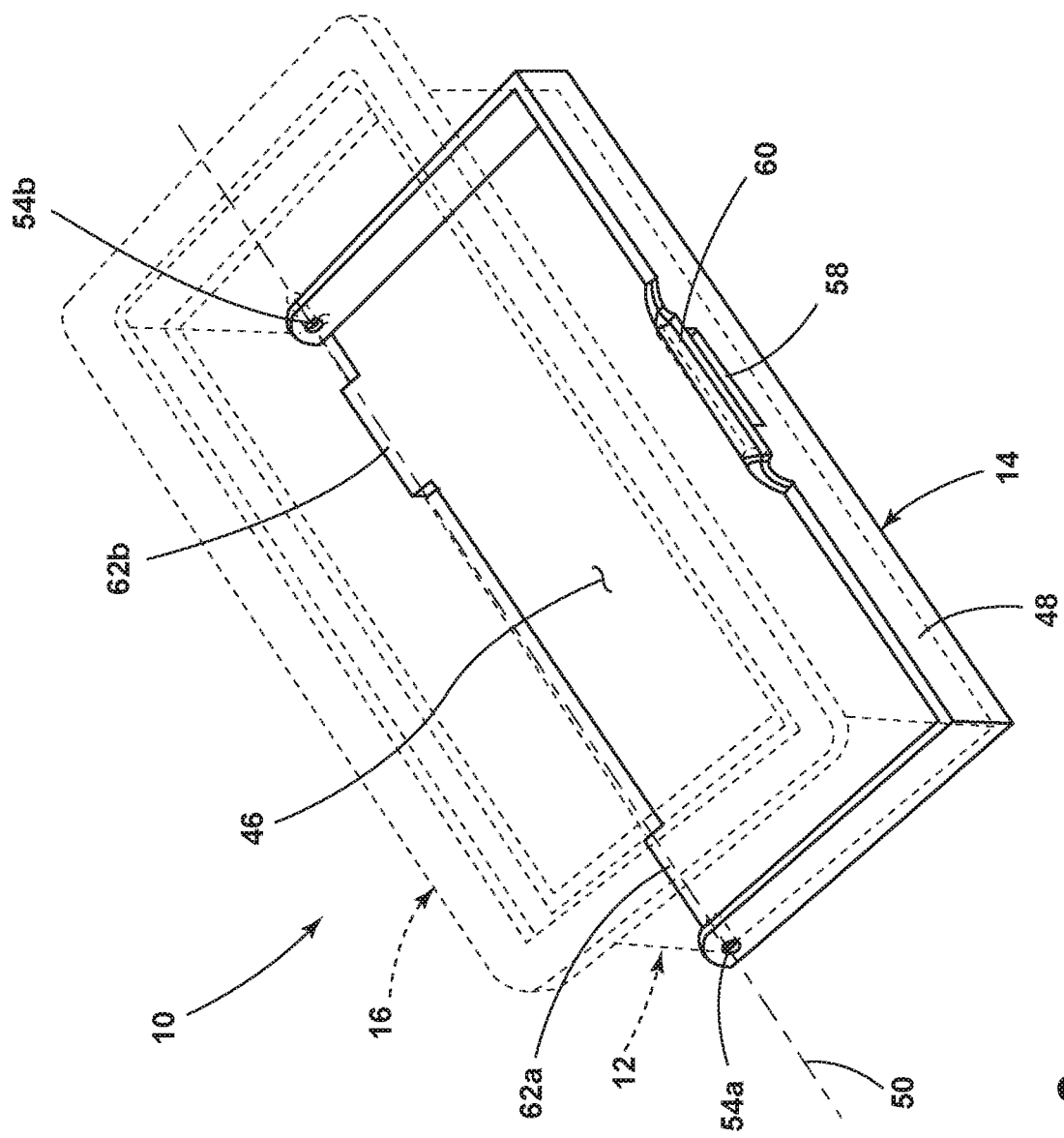
FIG. 3 is a perspective view of the convertible storage tray and garbage bag holder of FIG. 1, illustrating the releasable floor having a floor surface and several projections, with the housing and the bag retention frame shown in phantom.
Figure 4:
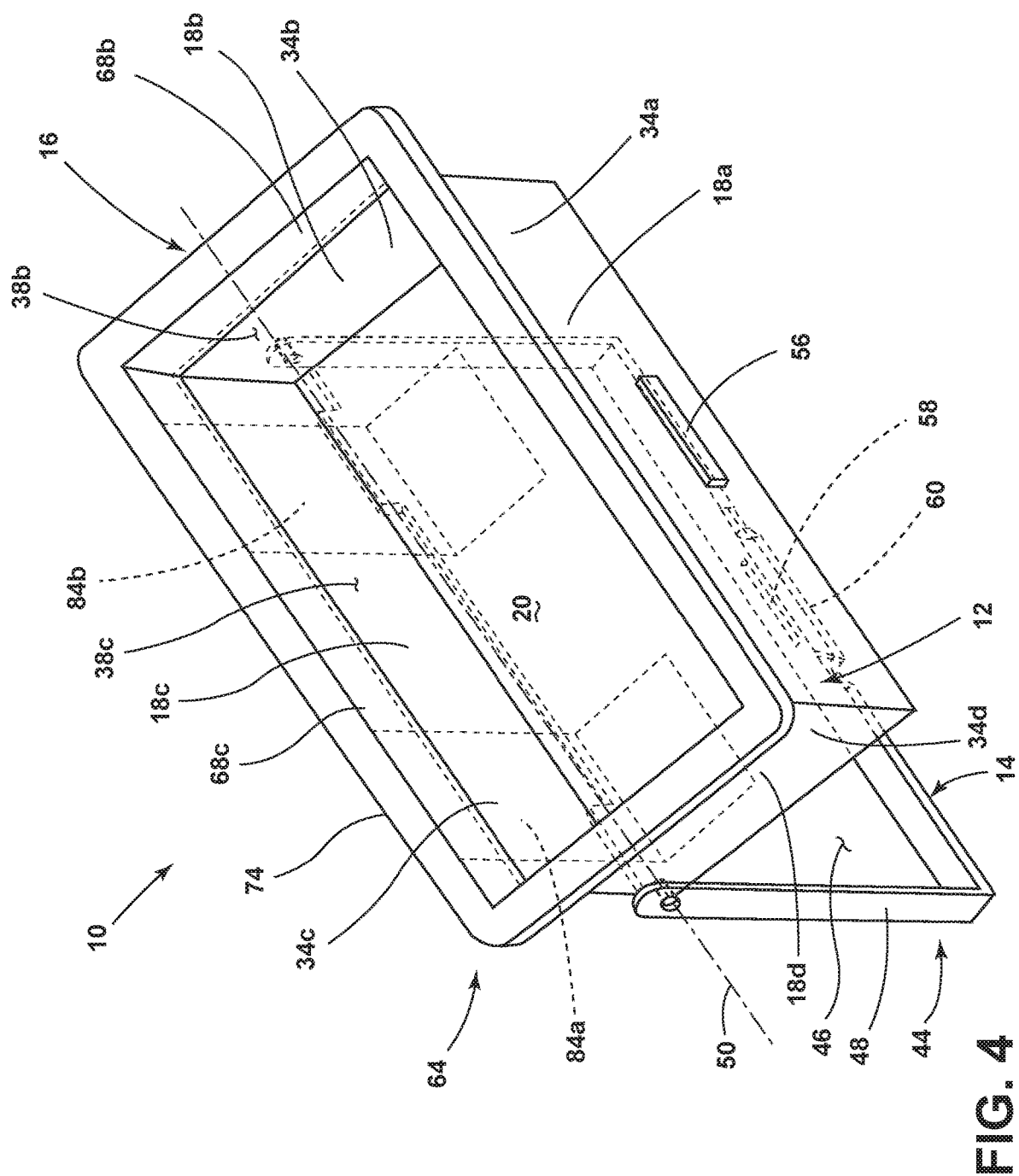
FIG. 4 is a perspective view of the convertible storage tray and garbage bag holder of FIG. 1, illustrating the releasable floor in an opened position relative to the housing, as compared to a closed position illustrated in FIG. 1.
Figure 5:
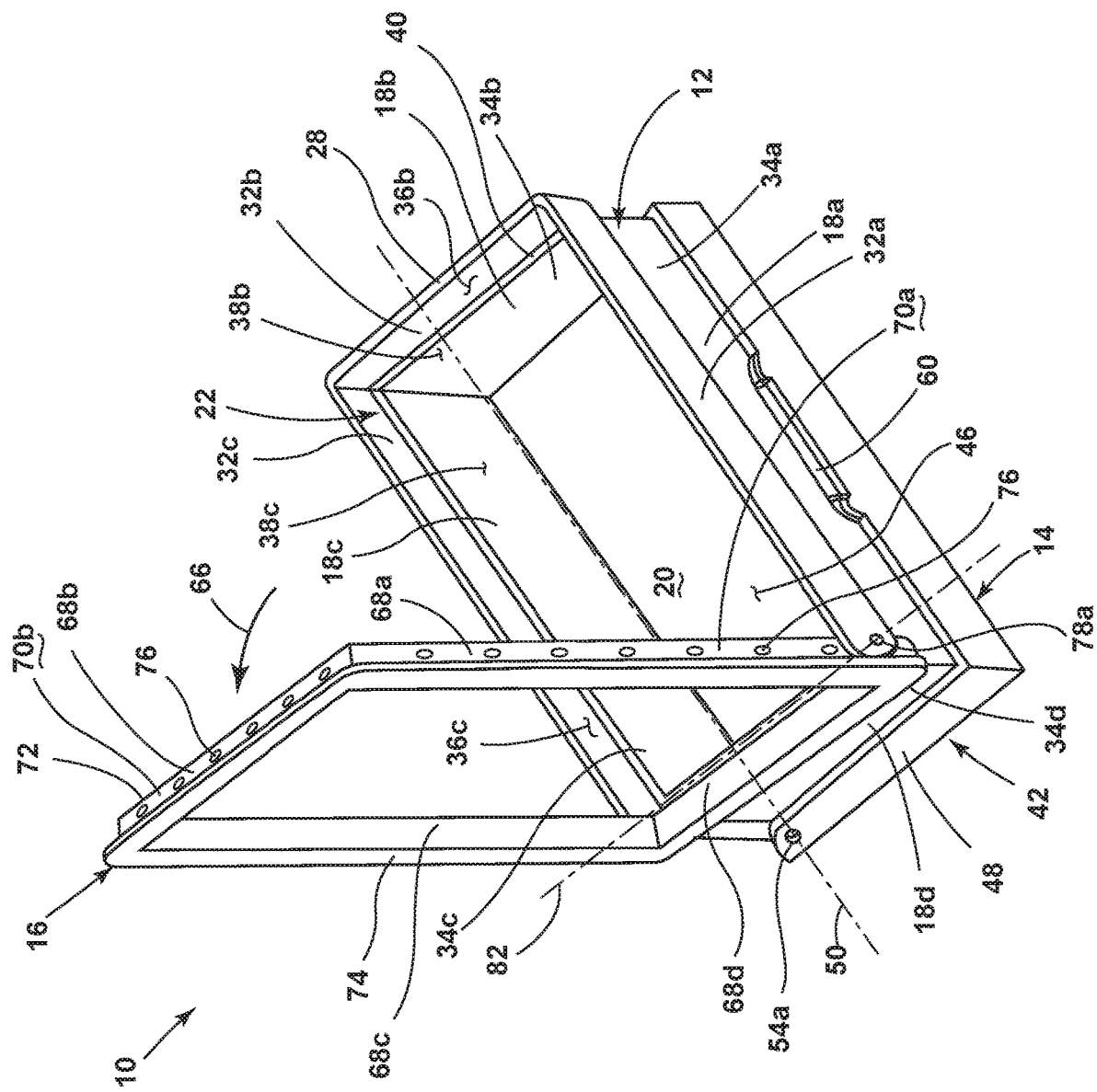
FIG. 5 is a perspective view of the convertible storage tray and garbage bag holder of FIG. 1, illustrating the bag retention frame in a disengaged position relative to the housing, as compared to an engaged position illustrated in FIG. 1.
Figure 6:
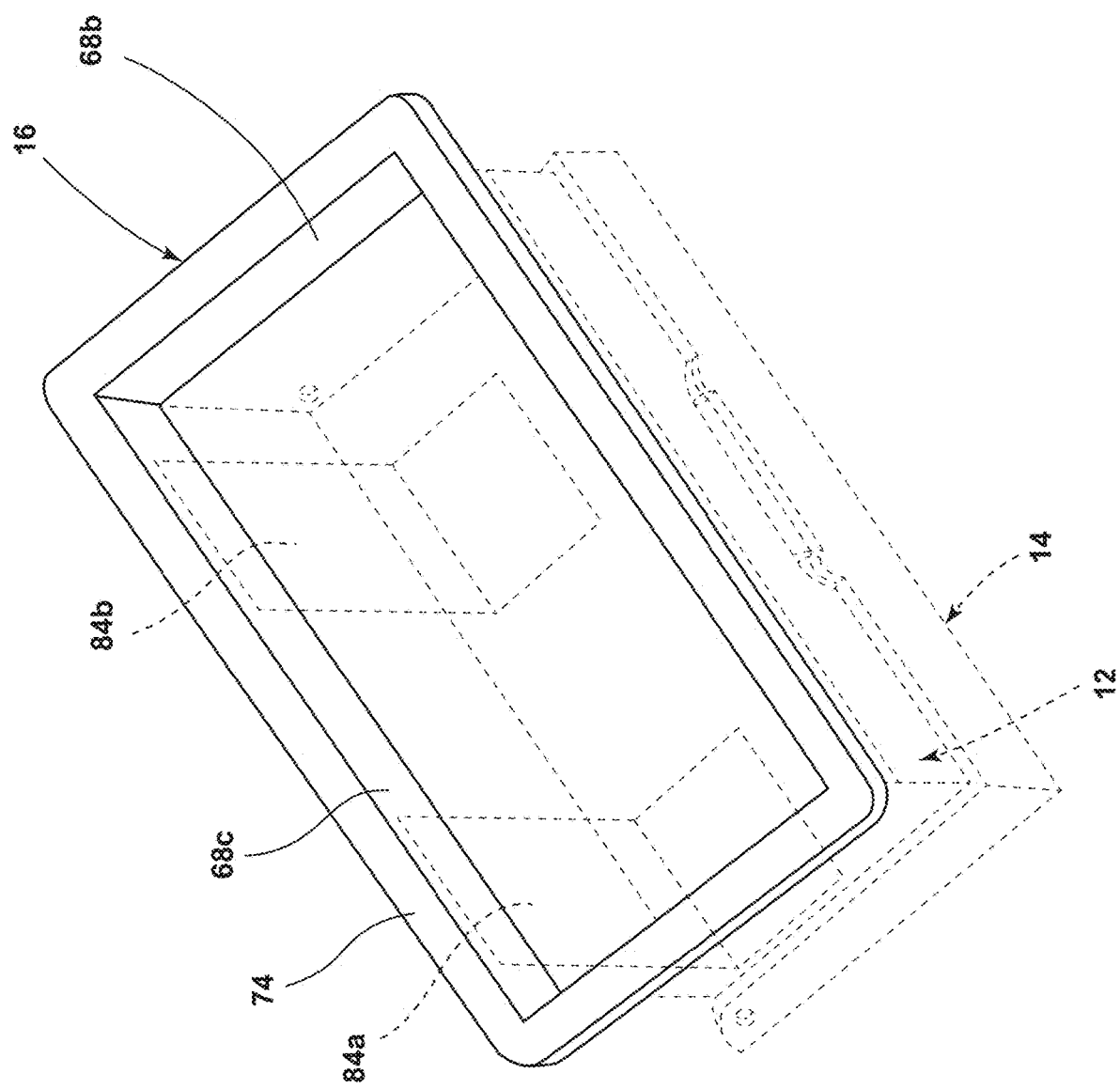
FIG. 6 is a perspective view of the convertible storage tray and garbage bag holder of FIG. 1, illustrating the bag retention frame having an outwardly extending lip and side walls, with the housing and releasable floor shown in phantom.

Referring additionally to FIGS. 3 and 4, the releasable floor 14 has a closed position 42 (see, e.g., FIG. 1) and an opened position 44 (see, e.g., FIG. 4), relative to the exit 24 out of the interior chamber 20 of the housing 12. In the closed position 42, the releasable floor 14 blocks the exit 24 out of the interior chamber 20 of the housing 12. For example, in the illustrated embodiment, the releasable floor 14 includes a floor surface 46. The floor surface 46 covers the bottom edge 30 of the housing 12 sufficiently to prevent items (such as coins and the like) intended to be stored in the convertible storage tray and garbage bag holder 10 from exiting out of the interior chamber 20 of the housing 12. In some embodiments, the floor surface 46 may form a seal against the bottom edge 30 of the housing 12. In addition, in the illustrated embodiment, the releasable floor 14 includes a side wall 48 extending upward from the floor surface 46. In the closed position 42, the side wall 48 cooperates with the floor surface 46 to retain an item or items in the interior chamber 20. In addition, in the closed position 42, the side wall 48 partially surrounds the housing 12 and faces side walls 18a, 18b, 18d of the housing 12.

In the opened position 44, the releasable floor 14 does not block the exit 24 out of the interior chamber 20 of the housing 12. As will be discussed further below, placing the releasable floor 14 in the opened position 44 allows a garbage bag to be held by the convertible storage tray and garbage bag holder 10 with the garbage bag extending through the interior chamber 20 of the housing 12 and out of the exit 24 of the interior chamber 20. The releasable floor 14 is capable of being selectively moved to, from, and between the closed position 42 and the opened position 44.

As mentioned, the releasable floor 14 is operably connected to the housing 12 in a manner that allows the releasable floor 14 to be selectively in either the opened position 44 or the closed position 42. For example, in the illustrated embodiment, the releasable floor 14 is one piece that is pivotally connected to the housing 12 and can pivot about a floor axis 50. More specifically, the housing 12 includes outwardly extending pivot pins 52a, 52b (see FIG. 2). The pivot pin 52a extends outwardly from the side wall 18d and the pivot pin 52b extends outwardly from the side wall 18b. The releasable floor 14 includes apertures 54a, 54b that cooperate with the pivot pins 52a, 52b of the housing 12. The pivot pin 52a extends into the aperture 54a and the pivot pin 52b extends into the aperture 54b, thus securing the releasable floor 14 to the housing 12 and allowing the releasable floor 14 to pivot about the floor axis 50 to move to, from, and between the opened position 44 and the closed position 42. The releasable floor 14 and the housing 12 can include structural features that cause the releasable floor 14 to remain in the closed position 42 until a force moves the releasable floor 14 to the opened position 44. In the illustrated embodiment, the housing 12 includes a projection 56 (see FIG. 2) and the releasable floor 14 includes an aperture 58. The aperture 58 cooperates with the projection 56 so that when the releasable floor 14 is moved from the opened position 44 to the closed position 42, the projection 56 projects into the aperture 58 and friction between the aperture 58 and the projection 56 prevents the releasable floor 14 from falling from the closed position 42 to the opened position 44 without a force dictating so. The releasable floor 14 includes a handle 60 to provide a structure to assert the force sufficient to move the releasable floor 14 to, from, and between the closed position 42 and the opened position 44. In the illustrated embodiment, the handle 60 projects upward and outward from the side wall 48 when the releasable floor 14 is in the closed position 42, and is disposed above the aperture 58.

The releasable floor 14 can further include projections 62a, 62b extending outwardly from the floor surface 46. In the illustrated embodiment, the projections 62a, 62b are on the opposite side of the releasable floor 14 as the handle 60. A purpose of the projections 62a, 62b is explained further below.

Referring additionally to FIGS. 5-13, the bag retention frame 16 has an engaged position 64 (see, e.g., FIG. 1) and a disengaged position 66 (see, e.g., FIG. 5), relative to the housing 12. In the engaged position 64, which is relative to the housing 12, the bag retention frame 16 engages with the housing 12 in a manner to secure a garbage bag between the bag retention frame 16 and the housing 12, as discussed below. To allow for such engagement, the bag retention frame 16 can match the general shape of the one or more side walls 18 (e.g., 18a-18d) of the housing 12. For example, the bag retention frame 16 of the illustrated embodiment includes walls 68a-d. Walls 68a-d provide outward facing surfaces 70a-70d respectively. The outward facing surfaces 70a-c of the walls 68a-c, respectively, face the inward facing surfaces 36a-c of the top sections 32a-c, respectively, of the housing 12, when the bag retention frame 16 is in the engaged position 64. In other words, the outward facing surface 70a of the wall 68a faces the inward facing surface 36a of the top section 32a of the side wall 18a of the housing 12, the outward facing surface 70b of the wall 68b faces the inward facing surface 36b of the top section 32b of the side wall 18b of the housing 12, and the outward facing surface 70c of the wall 68c faces the inward facing surface 36c of the top section 32c of the side wall 18c of the housing 12, when the bag retention frame 16 is in the engaged position 64. The bag retention frame 16 of the illustrated embodiment includes a bottom edge 72 formed by the walls 68a-d, which can be contiguous. When the bag retention frame 16 is in the engaged position 64, the bottom edge 72 of the bag retention frame 16 faces the ridge 40 of the housing 12.

The bag retention frame 16, as in the illustrated embodiment, can further include a lip 74. The lip 74 extends outwardly from the walls 68a-d. When the bag retention frame 16 is in the engaged position 64, the lip 74 extends over, and outwardly relative to, the top sections 32a-c of the side walls 18a-c, respectively, of the housing 12. When the bag retention frame 16 is in the engaged position 64, the housing 12 bears the load (the weight) of the bag retention frame 16. In the illustrated embodiment, the bag retention frame 16 can rest upon (that is, be seated upon) the top edge 28 and the ridge 40 of the housing 12, when the bag retention frame 16 is in the engaged position 64. The ridge 40 of the housing 12 can contact the bottom edge 72 of the bag retention frame 16 and thereby support the bag retention frame 16 in the engaged position 64. The top edge 28 of the housing 12 at side walls 18a-c can contact the lip 74 of the bag retention frame 16 and thereby support the bag retention frame 16 in the engaged position 64.

The bag retention frame 16 can include projections 76 that extend toward the housing 12 when the bag retention frame 16 is in the engaged position 64. As discussed further below, the projections 76 can further secure a garbage bag to the convertible storage tray and garbage bag holder 10. In the illustrated embodiment, the outward facing surface 70a-c of the walls 68a-c of the bag retention frame 16 includes the projections 76. The projections 76 extend toward the inward facing surfaces 36a-c of the side walls 18a-c of the housing 12, when the bag retention frame 16 is in the engaged position 64. When the bag retention frame 16 is moved to the engaged position 64, the projections 76 can cause a friction fit to the housing 12 (against the inward facing surfaces 36a-c of the side walls 18a-c) and cause the bag retention frame 16 to be secured in the engaged position 64 relative to the housing 12, until a sufficient force is applied to the bag retention frame 16 to move the bag retention frame 16 out of the engaged position 64. Additionally or alternatively, the inward facing surfaces 36a-c of the top sections 32a-c of the side walls 18a-c of the housing 12 can include the projections 76 that extend inward toward and, in some embodiments, press against the outward facing surfaces 70a-c of the bag retention frame 16 when the bag retention frame 16 is in the engaged position 64.

As mentioned above, the bag retention frame 16 is operably connected to the housing 12. For example, as in the illustrated embodiment, the bag retention frame 16 is pivotally connected to the housing 12. The housing 12 includes apertures 78a, 78b (see FIGS. 2 and 13). The aperture 78a can be provided through a portion of the top section 32a extending outwardly past the side wall 18d, and the aperture 78b can be provided thorough a portion of the top section 32c extending outwardly past the side wall 18d. The bag retention frame 16 can include pivot pins 80a, 80b, with the pivot pin 80a extending through the aperture 78a of the housing 12 and the pivot pin 80b extending through the aperture 78b of the housing 12, thus pivotally connecting the bag retention frame 16 to the housing 12 about a frame axis 82. The pivot pin 80a extends outwardly from the wall 68a and the pivot pin 80b extends outwardly from the wall 68c. The frame axis 82 can be, and in this embodiment, is orthogonal to the floor axis 50.

In the disengaged position 66, at least a portion of the bag retention frame 16 is disposed further away from the housing 12 than in the engaged position 64. For example, in reference to the illustrated embodiment, in the engaged position 64, the wall 68b of the bag retention frame 16 is adjacent the top section 32b of the side wall 18b of the housing 12, with the outward facing surface 70b of the wall 68b of the bag retention frame 16 facing the inward facing surface 36b of the side wall 18b of the housing 12. However, in the disengaged position 66, the wall 68b of the bag retention frame 16 is not adjacent the top section 32b of the side wall 18b of the housing 12 because the wall 68b of the bag retention frame 16 has pivoted away from the top section 32b.

Figure 14:
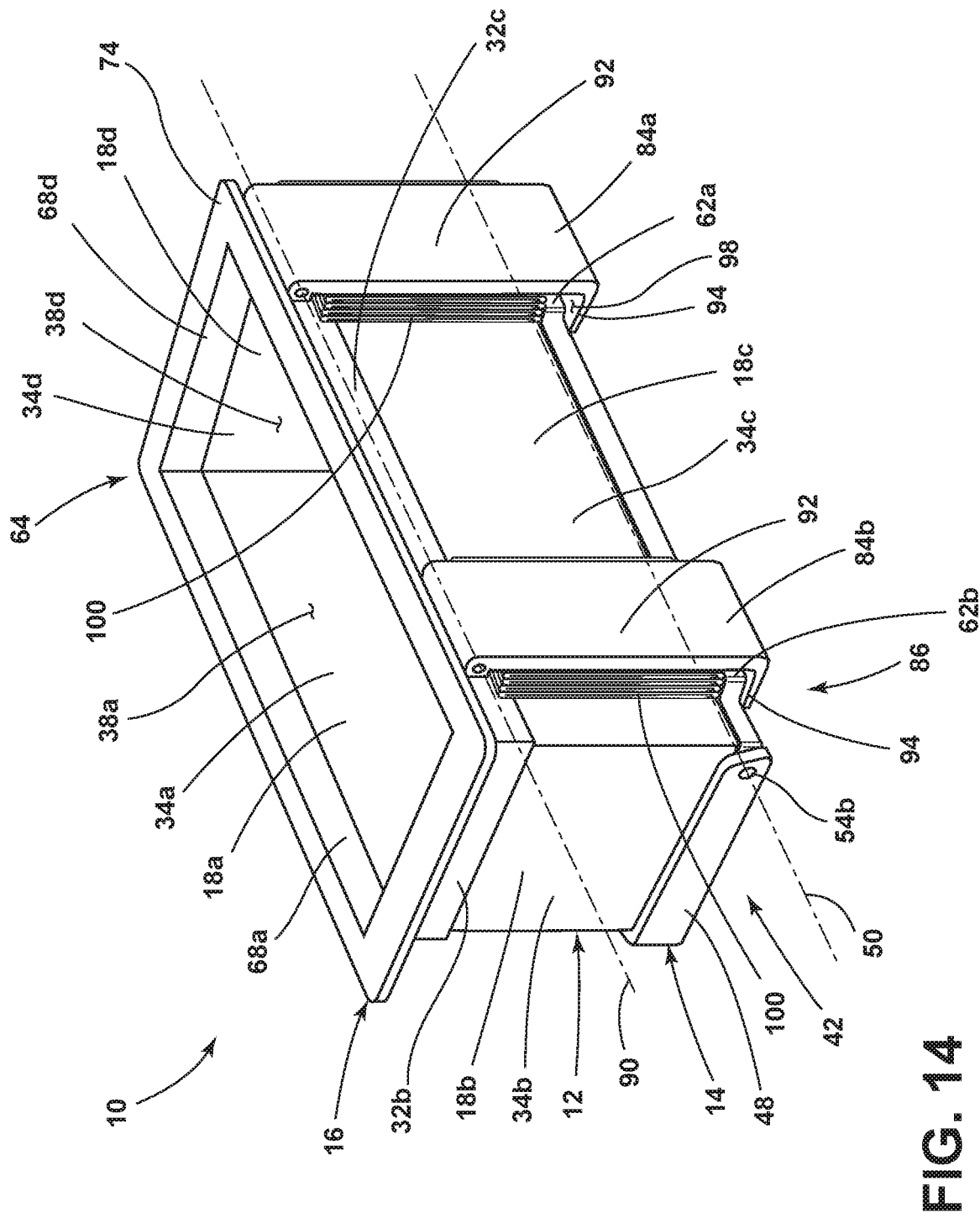
FIG. 14 is a perspective view of the convertible storage tray and garbage bag holder of FIG. 1, illustrating hooks pivotally connected to the housing, the hooks being in a first position closer to the housing.
Figure 15:
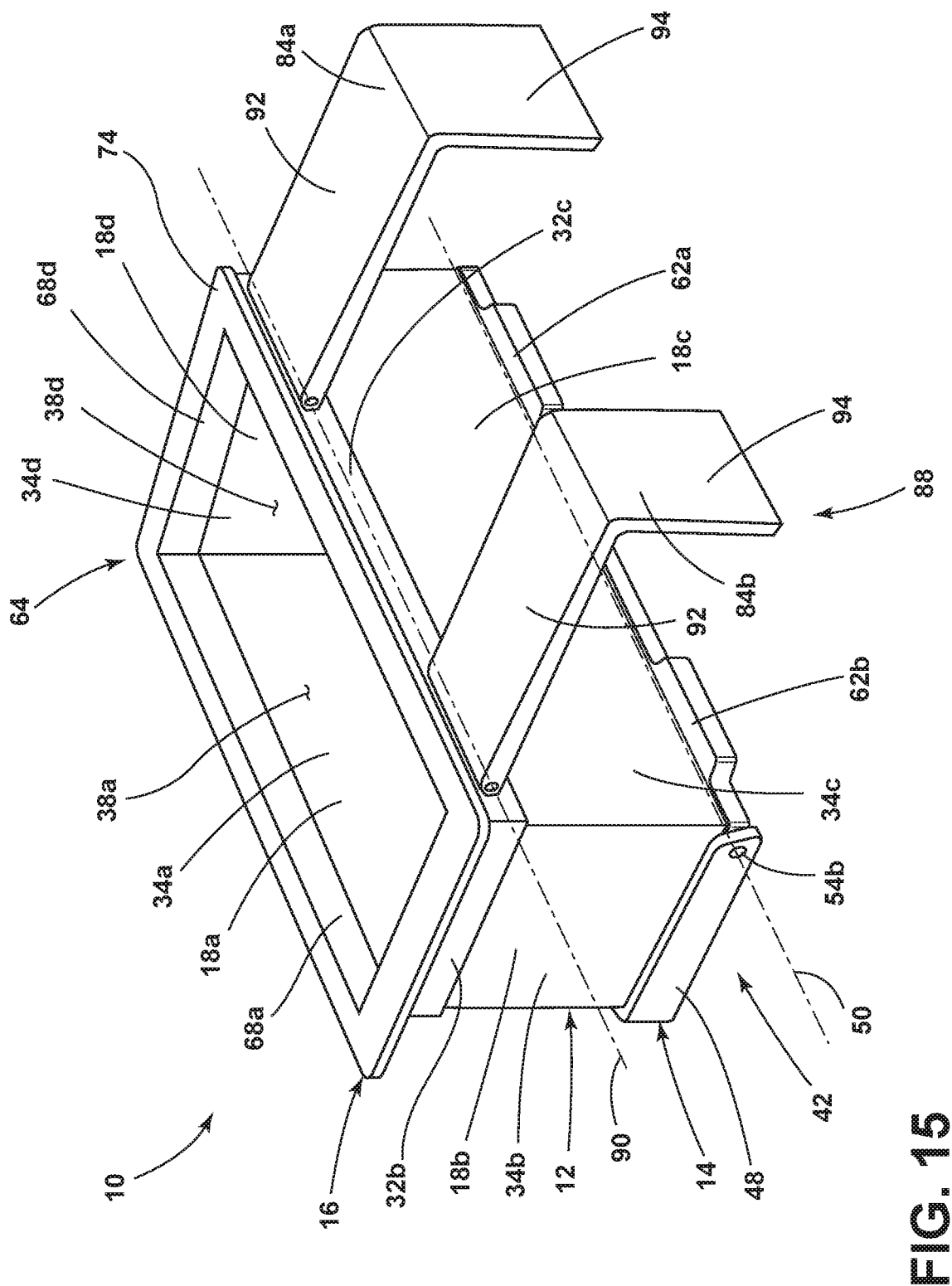
FIG. 15 is a perspective view of the convertible storage tray and garbage bag holder of FIG. 1, illustrating hooks pivotally connected to the housing, the hooks being in a second position extending away from the housing.
Figure 16:
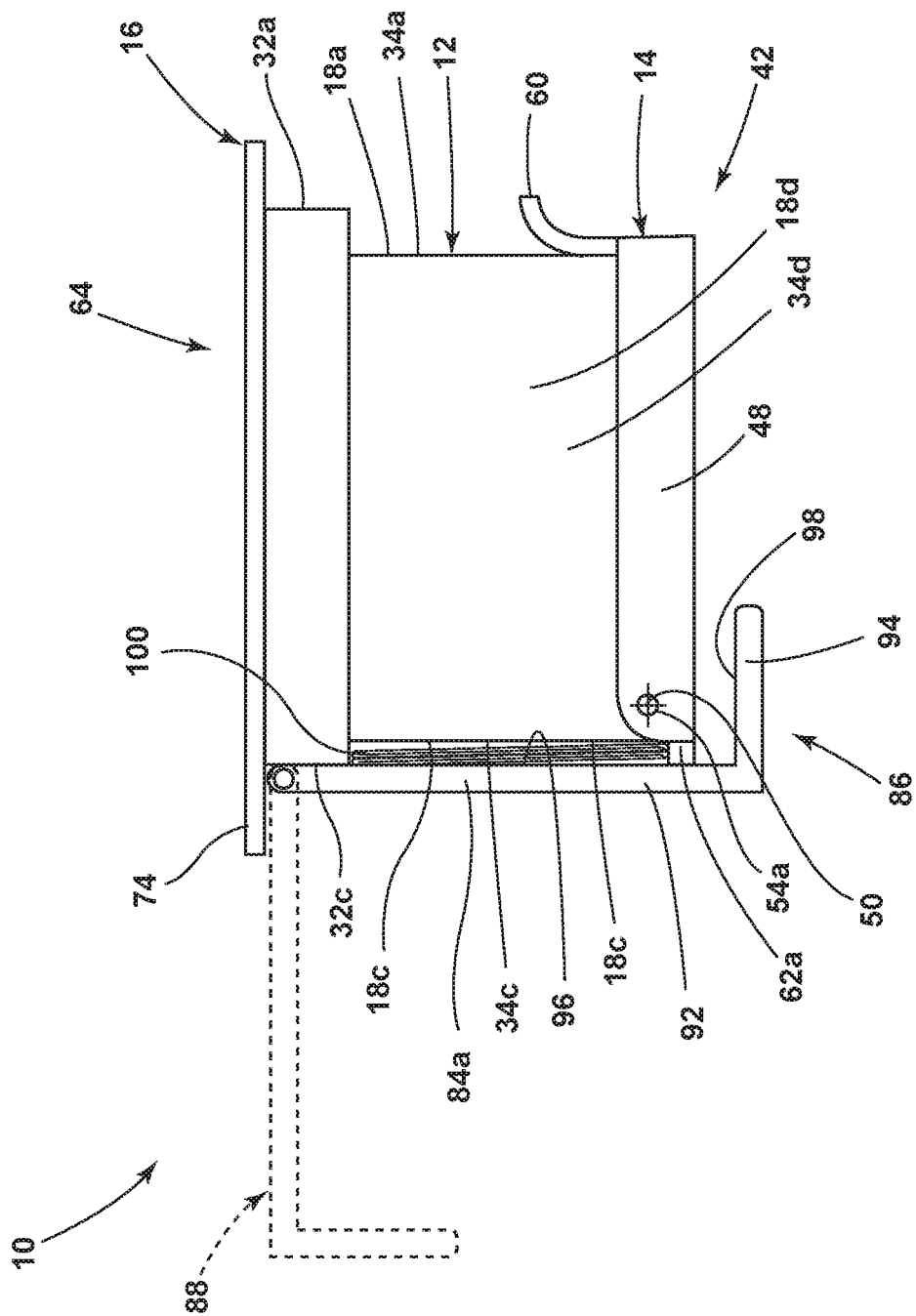
FIG. 16 is a side view of the convertible storage tray and garbage bag holder of FIG. 1, illustrating one of the projections of the releasable floor cooperating with one of the hooks in the first position to store unused garbage bags between the hook and the housing.

Referring additionally to FIGS. 14-16, in some embodiments, the convertible storage tray and garbage bag holder 10 further comprises one or more hooks 84 (e.g., 84a, 84b, in the illustrated embodiment) operably connected to the housing 12. The one or more hooks 84 can take a first position 86 (see, e.g., FIG. 14) and a second position 88 (see, e.g., FIG. 15). As discussed further below, the one or more hooks 84 allow the convertible storage tray and garbage bag holder 10 to be positioned at various places within a vehicle during use.

In the illustrated embodiment, the hooks 84a, 84b are pivotally connected to the housing 12. The hooks 84a, 84b are pivotally connected to the side wall 18c of the housing 12, at the top section 32c of the side wall 18c. The hooks 84a, 84b pivot at the pivotal connection about the same hook axis 90, which is parallel to the floor axis 50 but could be orthogonal thereto if the hooks 84a, 84b were pivotally connected to the side walls 18b or 18d instead.

Each hook 84a, 84b includes an extension portion 92 that extends away from the operable connection to the housing 12 (in this embodiment, the pivotal connection). Each extension portion 92 extends from the connection to the housing 12 to a hook portion 94, respectively. In the illustrated embodiment, the extension portion 92 includes a surface 96 that faces the housing 12 when the one or more hooks 84 are in the first position 86. More specifically, the surface 96 faces the side wall 18b of the housing 12 when the hooks 84 are in the first position 86. In the second position 88, the hook portion 94 is disposed further away from the housing 12 than when the one or more hooks 84 are in the first position 86, as the surface 96 of the extension portion 92 transitions from being generally parallel with the side wall 18b of the housing 12 to approaching (and possibly reaching) a generally orthogonal relationship with the side wall 18b of the housing 12. The hook portion 94 of the one or more hooks 84 includes a surface 98 that faces the releasable floor 14 when the one or more hooks 84 is in the first position 86 and the releasable floor 14 is in the closed position 42. In the first position 86 then, the one or more hooks 84 can generally conform to the shape of the housing 12 and the releasable floor 14, so as to reduce the footprint of the convertible storage tray and garbage bag holder 10 when being used to store items, as discussed further below. The hook portion 94 can be generally orthogonal to the extension portion 92, and both the hook portion 94 and the extension portion 92 can be generally planar, as in the illustrated embodiment. However, the hook portion 94 and the extension portion 92 can take a variety of shapes depending on the feature of the vehicle onto which the one or more hooks 84 are designed to hook.

The one or more hooks 84 cooperate with the projections 62a, 62b, described above, of the releasable floor 14 to provide a further storage opportunity when the one or more hooks 84 are in the first position 86. For example, empty garbage bags 100 (see FIGS. 14 and 16) can be stored between any or all of the one or more hooks 84 and the housing 12. In reference to the hook 84a, the extension portion 92 of the hook 84a supports the empty garbage bag 100 from one direction, and the side wall 18c of the housing 12 supports the empty garbage bag 100 from the opposite direction. The operable connection between the hook 84a and the housing 12 prevents the empty garbage bag 100 from moving beyond the operable connection in one direction, while the projection 62a of the releasable floor 14 supports and prevents the movement of the empty garbage bag 100 in the opposite direction.

Figure 17:
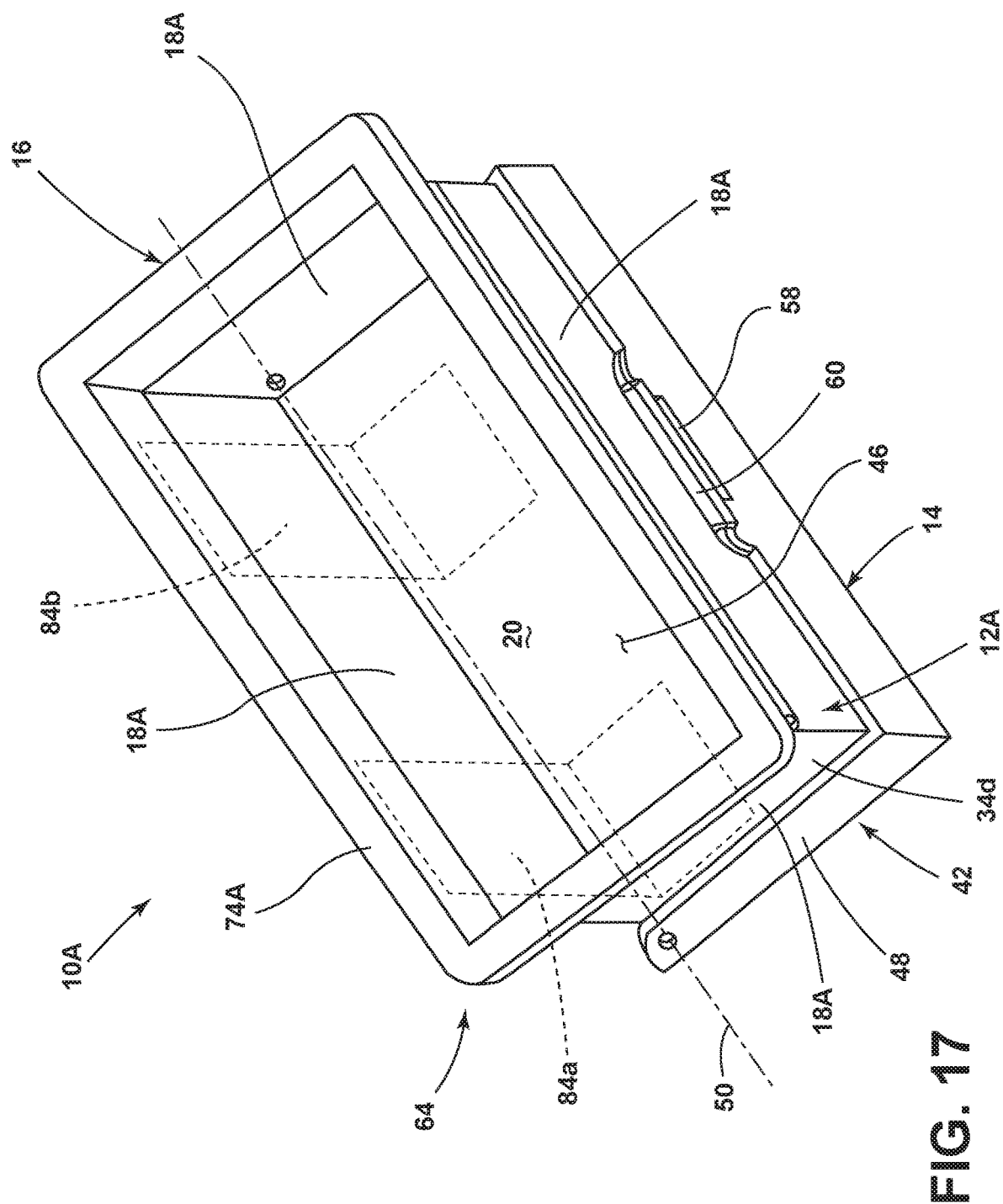
FIG. 17 is a perspective view of an alternative embodiment of a convertible storage tray and garbage bag holder, illustrating a releasable floor operably connected to a housing, which has an outwardly extending lip, without a bag retention frame.
Figure 18:
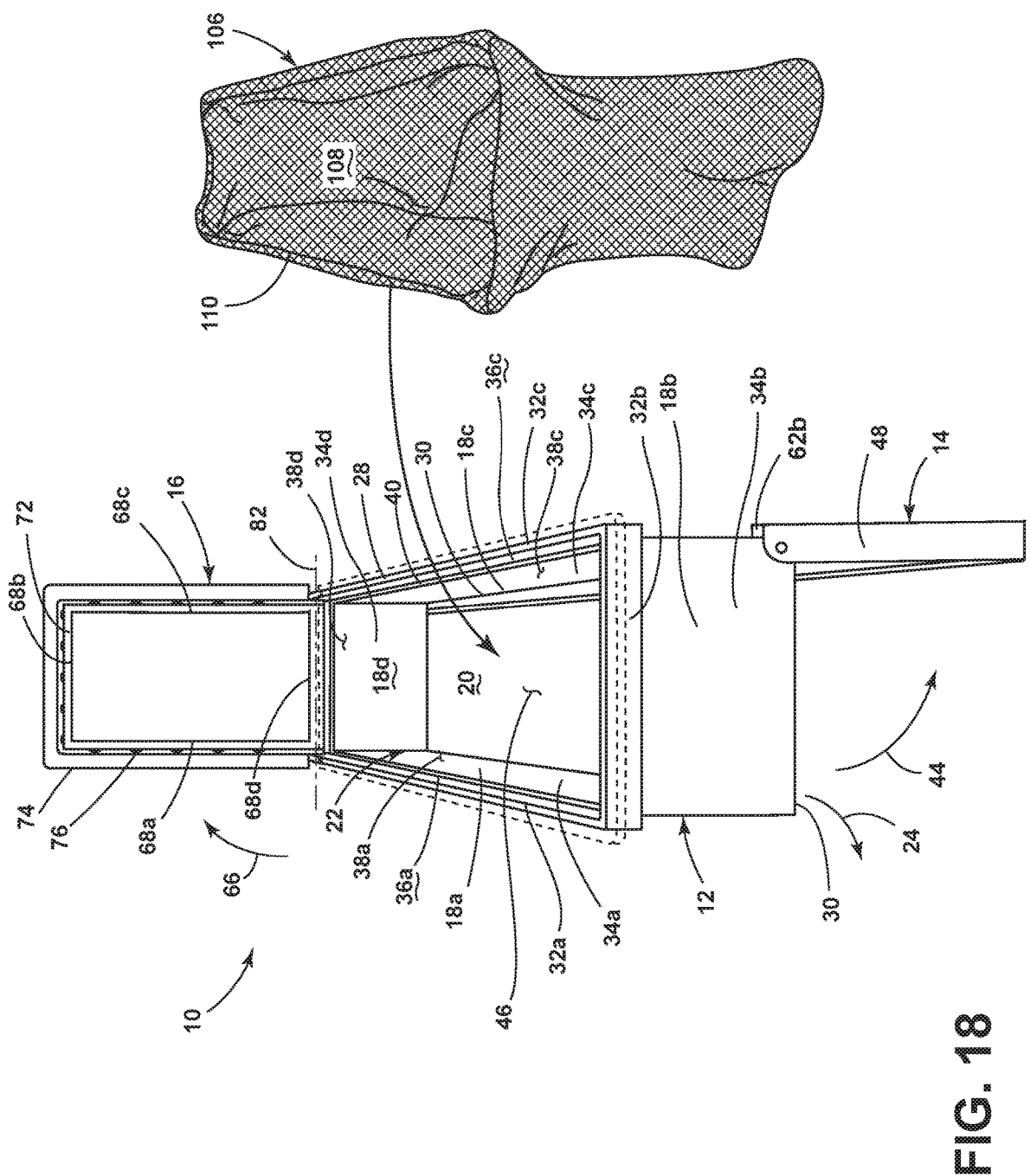
FIG. 18 is a view of a garbage bag before being inserted into the convertible storage tray and garbage bag holder of FIG. 1, with the releasable floor in the opened position and the bag retention frame in the disengaged position.
Figure 19:
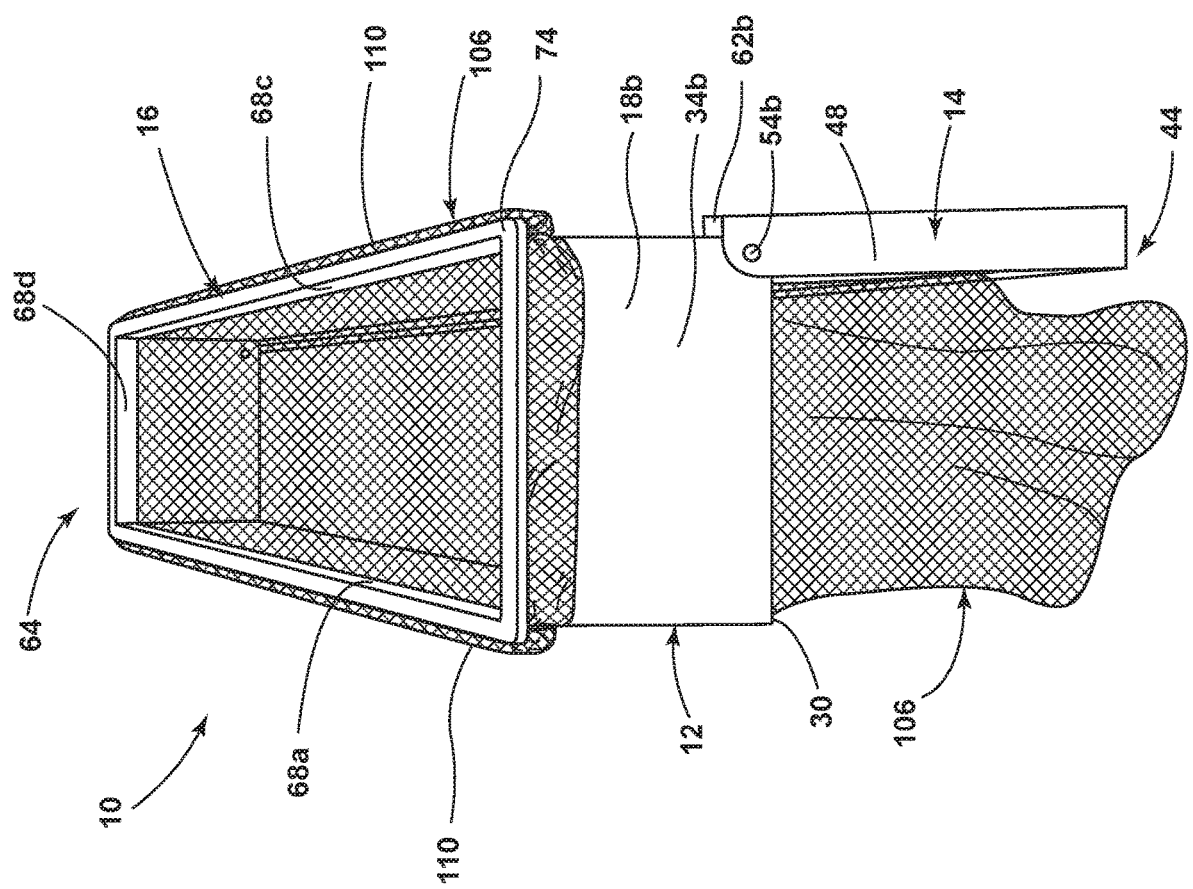
FIG. 19 is a perspective view of the convertible storage tray and garbage bag holder of FIG. 1 holding the garbage bag of FIG. 18, with the bag retention frame in the engaged position trapping a portion of an open top portion of the garbage bag between the bag retention frame and the housing, and an interior portion of the garbage bag extends through an exit of the interior chamber of the housing.
Figure 20:
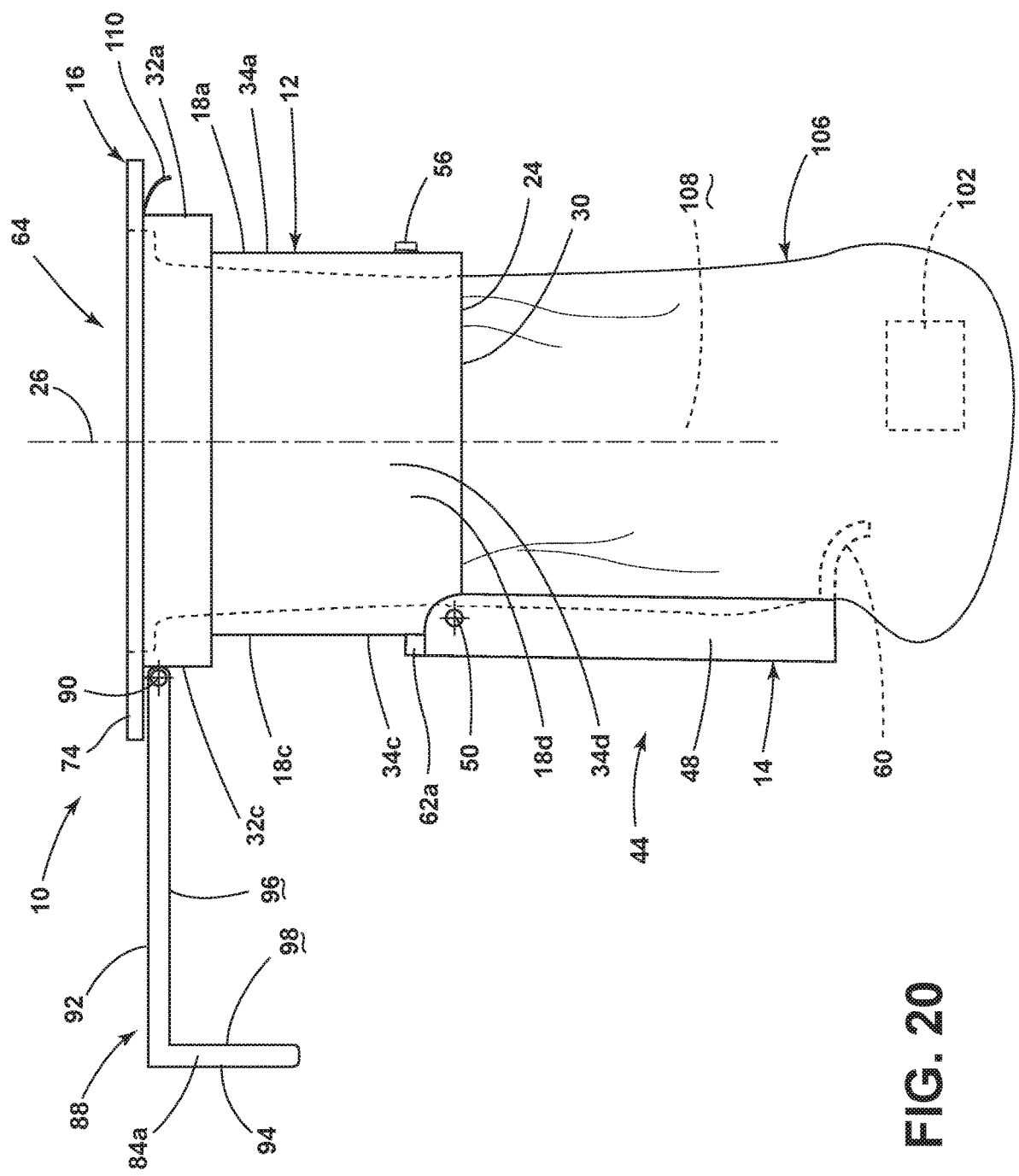
FIG. 20 is a side view of the convertible storage tray and garbage bag holder of FIG. 1 holding the garbage bag of FIG. 18, and garbage is being retained in an interior portion of the garbage bag, and one of the hooks is in the second position.
Figure 21:
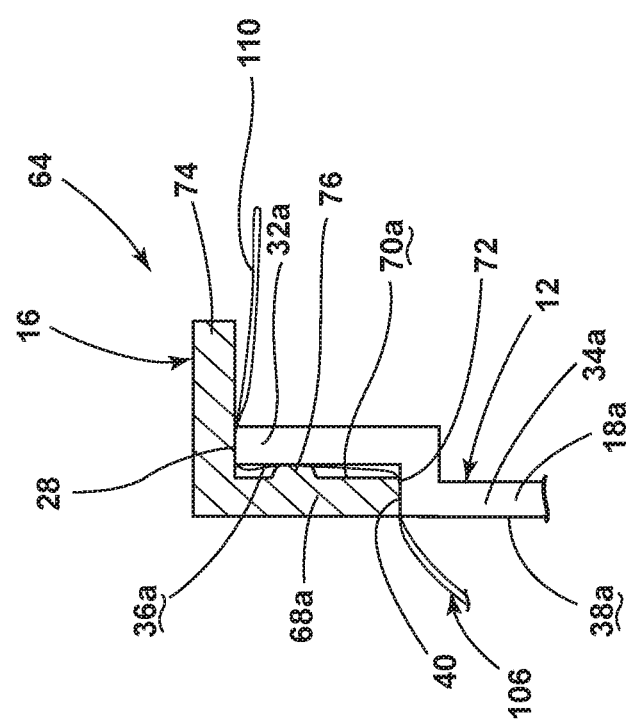
FIG. 21 is a side view of the convertible storage tray and garbage bag holder retaining the garbage bag taken through cross-section XXI-XXI of FIG. 19, illustrating one of the projections of the bag retention frame trapping the open top portion of the garbage bag between the bag retention frame and the housing, with the bag retention frame in the engaged position.
Figure 22:
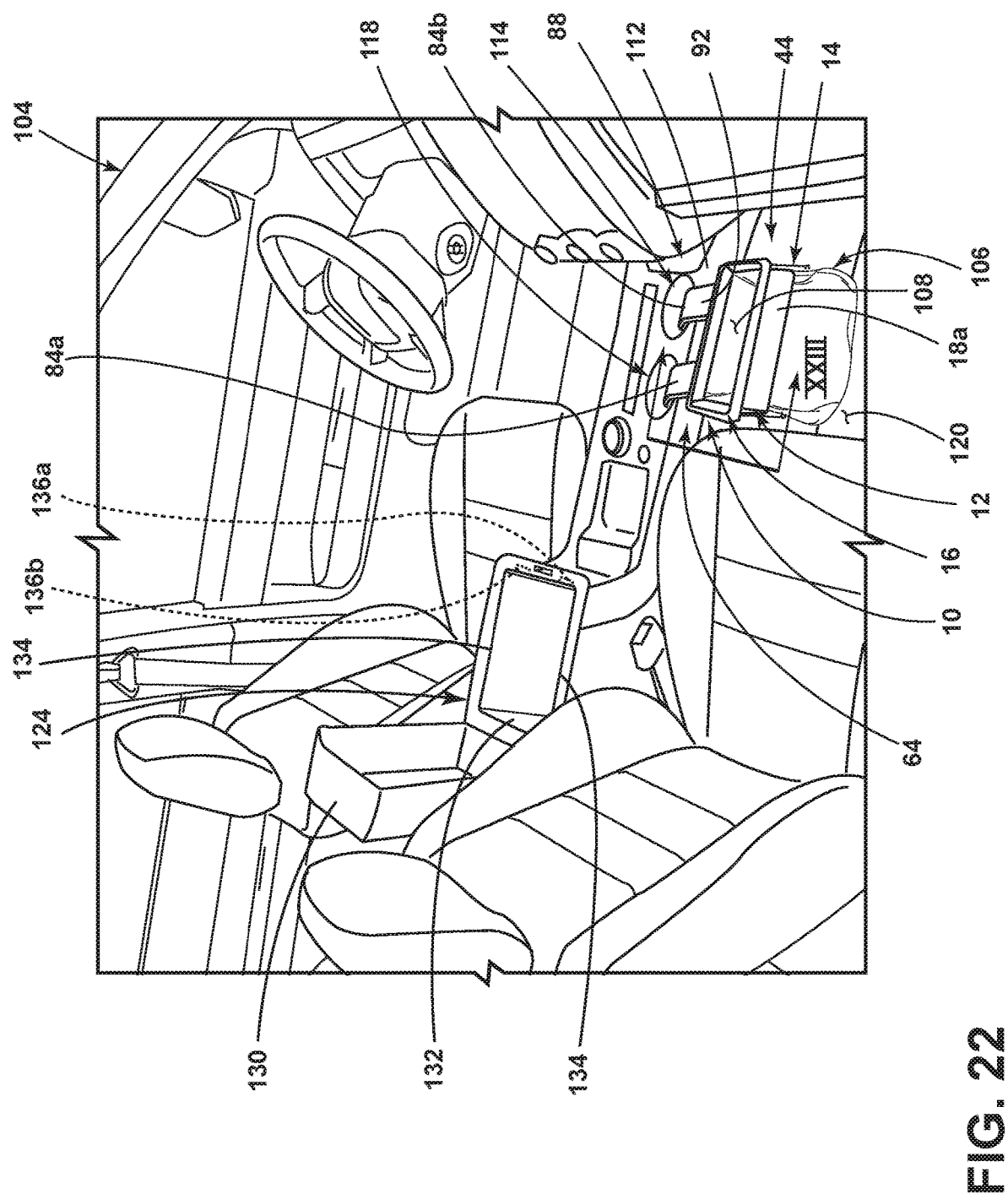
FIG. 22 is a perspective view of the convertible storage tray and garbage bag holder of FIG. 1, illustrating the hooks in the second position with a hook portion extending into a cup chamber of a cup holder interior feature to hook the convertible storage tray and garbage bag holder thereto while collecting garbage in the garbage bag.
Figure 23:
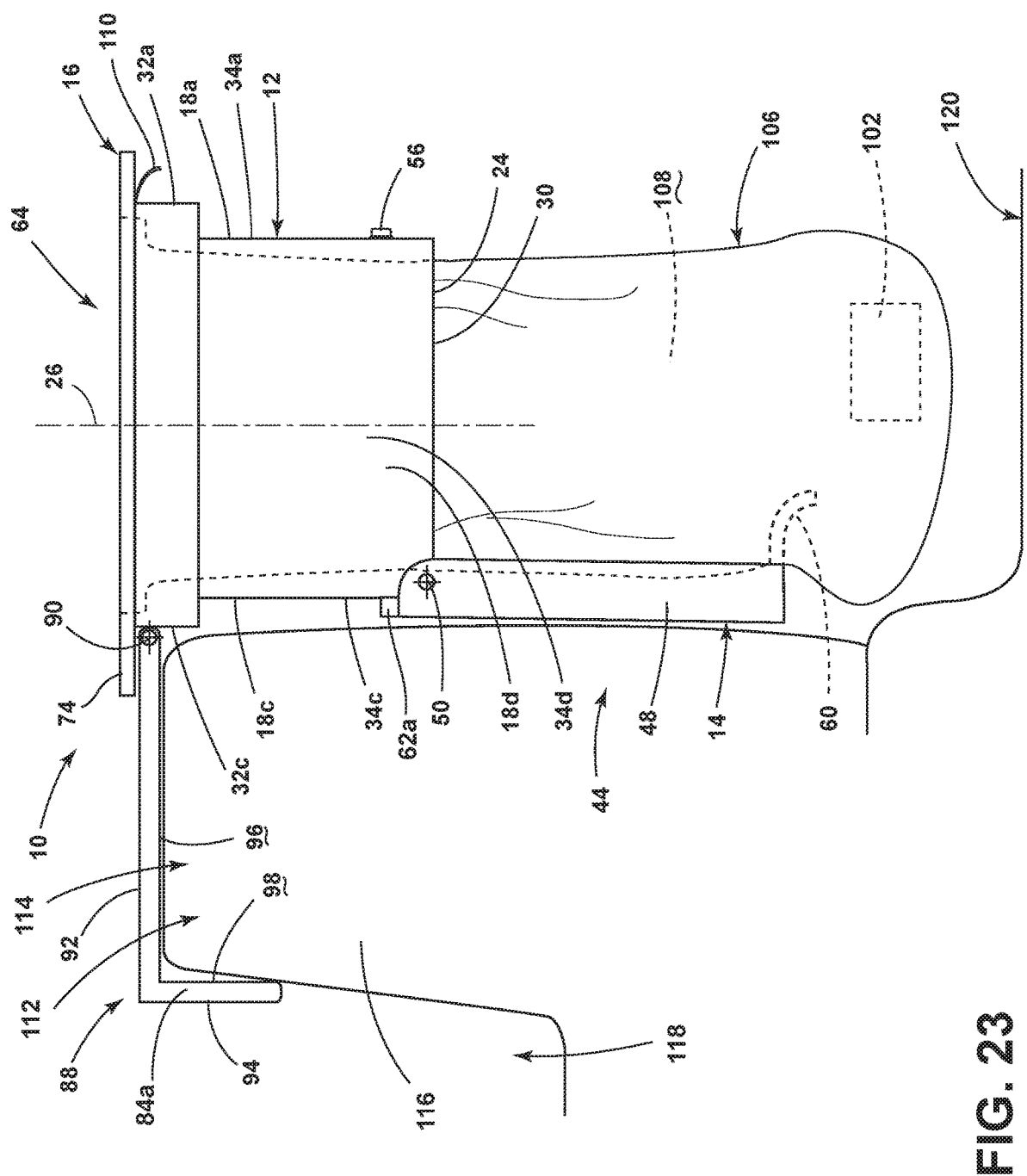
FIG. 23 is a side view taken along cross-section XXIII-XXIII of FIG. 22, illustrating the hook portion of one of the hooks extending into the cup chamber of the cup holder and an extension portion of the hook extending over a vertical side wall of the cup holder.

Referring now to FIG. 17, in an alternative embodiment, a tray 10A for an interior of a vehicle does not include the bag retention frame 16 that is separable from the housing 12, but is otherwise identical to the convertible storage tray and garbage bag holder 10 above. The tray 10A includes a housing 12A with one or more side walls 18A. The tray 10A further includes an outwardly extending lip 74A, which can be part of the housing 12A. The outwardly extending lip 74A in the illustrated embodiment extends around the entire housing 12A, but could be disposed on opposing sides of the housing 12A to allow the tray 10A to be set on opposing shelves of an interior console as discussed further below. All other aspects of the tray 10A are identical to the convertible storage tray and garbage bag holder 10 above, with the releasable floor 14 operably connected (pivotally connected, in the illustrated embodiment) to the housing 12A having the closed position 42 and the opened position 44. As discussed above, in the closed position 42, the releasable floor 14 blocks the exit 24 out of the interior chamber 20 of the housing 12A. In the opened position 44 (not separately illustrated for this embodiment), the releasable floor 14 does not block the exit 24 out of the interior chamber 20 of the housing 12A.

Referring now additionally to FIGS. 18-26, the convertible storage tray and garbage bag holder 10 disclosed above is further described herein in use with a novel method of collecting garbage 102 in a vehicle 104. The method includes presenting an embodiment of the convertible storage tray and garbage bag holder 10, such as those embodiments described above, which include the housing 12, the releasable floor 14 operably connected to the housing 12, and the bag retention frame 16 also operably connected to the housing 12. The method further includes presenting a garbage bag 106, which includes at least an interior portion 108 and an open top portion 110 that forms an opening into the interior portion 108. As discussed further below, the garbage 102 can be placed within the interior portion 108 of the garbage bag 106, through the opening, for collection and subsequent disposal. The method further includes moving the releasable floor 14 of the convertible storage tray and garbage bag holder 10 to the opened position 44, if the releasable floor 14 is not in the opened position 44, such as in the closed position 42. Moving the releasable floor 14 to the opened position 44 allowed the interior portion 108 of the garbage bag 106 to extend through the interior chamber 20 of the housing 12 and out of the exit 24 of the interior chamber 20 when the garbage bag 106 is placed to be retained by the convertible storage tray and garbage bag holder 10.

The method further includes moving the bag retention frame 16 to the disengaged position 66, if the bag retention frame 16 is not in the disengaged position 66, such as in the engaged position 64. Moving the bag retention frame 16 to the disengaged position 66 allows the open top portion 110 of the garbage bag 106 to be placed between the housing 12, such as the top sections 32a-c of the side walls 18a-c, and where the bag retention frame 16 will be when the bag retention frame 16 is subsequently moved to the engaged position 64 relative to the housing 12.

The method further includes disposing the garbage bag 106 within the interior chamber 20 of the housing 12 such that the interior chamber 20 of the housing 12 surrounds at least a portion of the interior portion 108 of the garbage bag 106. The method further includes moving the bag retention frame 16 to the engaged position 64 and thereby trapping at least a portion of the open top portion 110 of the garbage bag 106 between the bag retention frame 16 and the housing 12. This can include trapping at least a portion of the open top portion 110 of the garbage bag 106 between the outward facing surfaces 70a-c of the bag retention frame 16 and the inward facing surfaces 36a-c of the top section 32a-c of the one or more side walls 18a-c of the housing 12. The projections 76 of the bag retention frame 16 can further trap the garbage bag 106 between the projections 76 and the inward facing surfaces 36a-c of the top sections 32a-c of the one or more side walls 18a-c of the housing 12.

As illustrated in FIGS. 19-23, when the garbage bag 106 is installed, the convertible storage tray and garbage bag holder 10 further includes the garbage bag 106. The interior portion 108 of the garbage bag 106 is disposed within the interior chamber 20 of the housing 12 (that is, the interior chamber 20 of the housing 12 surrounds at least a portion of the interior portion 108 of the garbage bag 106). The interior portion 108 of the garbage bag 106 additionally extends out of the exit 24 of the interior chamber 20, with the releasable floor 14 in the opened position 44 not blocking the exit 24. At least a portion of the open top portion 110 of the garbage bag 106 is disposed (such as trapped, clamped, or otherwise secured in place) between the bag retention frame 16 and the housing 12, when the bag retention frame 16 is in the engaged position 64. The method further includes placing the garbage 102 within the interior portion 108 of the garbage bag 106.

As mentioned above, the convertible storage tray and garbage bag holder 10 can include one or more hooks 84 that are operably connected to the housing 12. The method can further include moving the one or more hooks 84 operably connected to the housing 12 to the second position 88. As discussed above, in the second position 88, the hook portion 94 of the one or more hooks 84 is disposed further away from the housing 12 than in the first position 86. The method can further include placing the one or more hooks 84 over an interior feature 112 of the vehicle 104. The interior feature 112 can be a cup holder 114, which can have a vertical side wall 116 adjacent a cup chamber 118, into which a bottle, cup, or other liquid container (not illustrated) can be placed. In such a case, the hook portion 94 of the one or more hooks 84 extends into the cup chamber 118 and the extension portion 92 extends over the vertical side wall 116 of the cup holder 114. Other possible interior features 112 include, but are not limited to, a map pocket, a storage bin, a tailgate, a seatback pouch, a rear quarter panel bin (e.g., for collecting garbage during tailgating events), and a mobility device. Features located on the exterior of the vehicle 104 also can retain the convertible storage tray and garbage bag holder 10 to the vehicle 104 via the one or more hooks 84.

Placing the one or more hooks 84 over the interior feature 112 of the vehicle 104 secures the convertible storage tray and garbage bag holder 10 within the vehicle 104 in a manner that elevates the open top portion 110 of the garbage bag 106 off of a floor 120 of the vehicle 104. The entire interior portion 108 of the garbage bag 106 can be elevated off of the floor 120. The garbage 102 can be collected within the garbage bag 106 retained by the convertible storage tray and garbage bag holder 10.

At some point in time, the user of the convertible storage tray and garbage bag holder 10 might not need to collect the garbage 102 within the garbage bag 106 secured by the convertible storage tray and garbage bag holder 10 and, instead, desire to use the convertible storage tray and garbage bag holder 10 as a tray to store another item 122 or items (see FIG. 24). The method further includes moving the bag retention frame 16 to the disengaged position 66. In the disengaged position 66, the bag retention frame 16 no longer traps (or clamps or otherwise secures) the garbage bag 106 (such as the open top portion 110 of the garbage bag 106) between the bag retention frame 16 and the housing 12 (such as the top sections 32a-c of the housing 12). The method further includes removing the garbage bag 106 from the convertible storage tray and garbage bag holder 10. Because the bag retention frame 16 is in the disengaged position 66, the garbage bag 106 is free to be removed by the user or otherwise from the housing 12. The user can then dispose of the garbage bag 106 with the garbage 102 retained in the interior portion 108 thereof.

The method further includes moving the bag retention frame 16 back to the engaged position 64 and moving the releasable floor 14 to the closed position 42. Because the releasable floor 14 is in the closed position 42, the exit 24 out of interior chamber 20 of the housing 12 is blocked and the item 122 can be stored in the interior chamber 20 of the housing 12 if desired.

The method further includes placing the convertible storage tray and garbage bag holder 10 into an interior console 124 of the vehicle 104. The interior console 124 can be disposed between a first seating assembly 126 and a second seating assembly 128 of the vehicle 104. The interior console 124 can include a top 130 that opens to reveal an interior chamber 132. The convertible storage tray and garbage bag holder 10 can be placed at least partially within the interior chamber 132 of the interior console 124. The method further includes retaining the item 122 in the interior chamber 20 of the housing 12 of the convertible storage tray and garbage bag holder 10. The item 122 can be a key, a compact disc, a wallet, or any other item that fits within the interior chamber 20 of the housing 12.

As mentioned above, the bag retention frame 16 further includes the lip 74 that extends over, and outwardly relative to, the side walls 18a-c of the housing 12, when the bag retention frame 16 is in the engaged position 64. The interior console 124 of the vehicle 104 includes opposing surfaces 134 such as shelves or the surface provided by an outer perimeter of the interior chamber 132. The act of placing the convertible storage tray and garbage bag holder 10 into the interior console 124 of the vehicle 104 can thus include setting the lip 74 of the bag retention frame 16 upon the opposing surfaces 134 of the interior console 124. The convertible storage tray and garbage hag holder 10 is elevated within the interior chamber 132 of the interior console 124 and held in place in the direction between the opposing surfaces 134. In other words, the lip 74 of the convertible storage tray and garbage hag holder 10 sits upon the surface provided by the perimeter of the interior chamber 132 with the housing 12 extending into the interior chamber 132 of the interior console 124. The user can slide the convertible storage tray and garbage hag holder 10 forward or rearward as desired to provide access to reach elsewhere within the interior chamber 132 of the interior console 124.

The interior console 124 can include one or more slots 136 (e.g., 136a, 136b, in the illustrated embodiment) disposed beneath a top wall 138 and accessible from the interior chamber 132. The act of placing the convertible storage tray and garbage bag holder 10 into the interior console 124 of the vehicle 104 can include inserting the hook portion 94 of each of the one or more hooks 84 into the slot of the one or more slots 136 (for example, the hook portion 94 of the hook 84a is inserted into the slot 136a, and the hook portion 94 of the hook 84b is inserted into the slot 136b) such that the top wall 138 of the interior console 124 is disposed between the one or more hooks 84 and the releasable floor 14. So positioning the convertible storage tray and garbage bag holder 10 allows the user to obtain greater space to access the interior chamber 132 of the interior console 124 while the housing 12 of the convertible storage tray and garbage bag holder 10 still retains the item 122.

As mentioned above, the convertible storage tray and garbage bag holder 10 can include the releasable floor 14 with the projections 62a, 62b that cooperate with the one or more hooks 84 to store items such as the empty garbage bags 100 when the one or more hooks 84 are in the first position 86. The method can further include moving the hook 84 (e.g., the hook 84a or 84b) of the one or more hooks 84 to the second position 88. For example, the user can lift the hook 84 away from the housing 12. The method can further include trapping (such as clamping) the empty garbage bag 100 between the hook 84 and the housing 12 while moving the hook 84 toward the first position 86. The trapping of the empty garbage bag 100 can be done before placing the convertible storage tray and garbage bag holder 10 into the interior console 124 of the vehicle 104. Therefore, the convertible storage tray and garbage bag holder 10 can hold the empty garbage bag 100 even while acting as a tray to store the item 122 within the housing 12. Holding the empty garbage bag 100 in this manner makes it easier for the user to convert the convertible storage tray and garbage bag holder 10 back into holding the garbage bag 106 to collect the garbage 102.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tray for an interior of a vehicle comprising:
   a housing including an interior chamber surrounded by one or more side walls, the interior chamber having an opening into the interior chamber and an exit out of the interior chamber;
   a releasable floor operably connected to the housing and having a closed position and an opened position; and
   one or more hooks operably connected to the housing, the one or more hooks each comprising (a) a first position, (b) an extension portion extending away from the operable connection to the housing to a hook portion, the hook portion including a surface that faces the releasable floor when the releasable floor is in the closed position and the one or more hooks is in the first position, and (c) a second position where the hook portion of the one or more hooks is disposed further away from the housing than in the first position;
   wherein, in the closed position, the releasable floor blocks the exit out of the interior chamber of the housing; and
   wherein, in the opened position, the releasable floor does not block the exit out of the interior chamber of the housing.

2. The tray of claim 1,
   wherein, the releasable floor is pivotally connected to the housing.

3. The tray of claim 1 further comprising:
   an outwardly extending lip on opposing sides of the housing.

4. The tray of claim 1,
the releasable floor is pivotally connected to the housing about a floor axis; and
the one or more hooks are pivotally connected to the housing about a hook axis that is parallel to the floor axis.

5. A vehicle comprising:
a tray comprising:
   a housing including an interior chamber surrounded by one or more side walls, the interior chamber having an opening into the interior chamber and an exit out of the interior chamber;
   a releasable floor operably connected to the housing and having a closed position and an opened position; and
   one or more hooks operably connected to the housing, the one or more hooks each comprising (a) a first position, (b) an extension portion extending away from the operable connection to the housing to a hook portion, the hook portion including a surface that faces the releasable floor when the releasable floor is in the closed position and the one or more hooks is in the first position, and (c) a second position where the hook portion of the one or more hooks is disposed further away from the housing than in the first position;
   wherein, in the closed position, the releasable floor blocks the exit out of the interior chamber of the housing; and
   wherein, in the opened position, the releasable floor does not block the exit out of the interior chamber of the housing.

6. The vehicle of claim 5 further comprising:
an interior console comprising an interior chamber and a surface provided by a perimeter of the interior chamber;
wherein, the tray further comprises an outwardly extending lip on opposite sides of the housing, and the lip of the tray sits upon the surface provided by the perimeter of the interior chamber with the housing extending into the interior chamber.

7. The vehicle of claim 5 further comprising:
an interior console comprising an interior chamber, a top wall, and one or more slots disposed beneath the top wall and accessible from the interior chamber;
wherein, the hook portion of the one or more hooks is disposed in one or more slots of the interior console; and
wherein, the top wall of the interior console is disposed between the hook portion of the one or more hooks and the releasable floor of the tray.

8. The vehicle of claim 5,
the tray further comprising a bag retention frame operably connected to the housing, the bag retention frame having an engaged position relative to the housing and a disengaged position relative to the housing wherein at least a portion of the bag retention frame is disposed further away from the housing than in the engaged position.

9. The vehicle of claim 8,
the one or more side walls of the housing of the tray comprising inward facing surfaces; and
the bag retention frame comprising outward facing surfaces that face the inward facing surfaces of the one or more side walls of the housing when the bag retention frame is in the engaged position.

10. The vehicle of claim 8,
the bag retention frame is pivotally connected to the housing.

11. A convertible storage tray and garbage bag holder comprising:
   a housing including an interior chamber surrounded by one or more side walls, the interior chamber having an opening into the interior chamber and an exit out of the interior chamber;
   a releasable floor pivotally connected to the housing about a floor axis, the releasable floor having a closed position blocking the exit out of the interior chamber of the housing and an opened position not blocking the exit out of the interior chamber of the housing; and
   a bag retention frame pivotally connected to the housing about a frame axis that is orthogonal to the floor axis, the bag retention frame having an engaged position relative to the housing and a disengaged position relative to the housing wherein at least a portion of the bag retention frame is disposed further away from the housing than in the engaged position.

12. The convertible storage tray and garbage bag holder of claim 11,
the housing further comprising a bottom edge; and
the releasable floor further comprising a floor surface, the floor surface forming a seal against the bottom edge of the housing when the releasable floor is in the closed position.

13. The convertible storage tray and garbage bag holder of claim 11,
the interior chamber of the housing having an axis extending through the opening and the exit;
at least a portion of the one or more side walls of the housing comprising:
   a top section including an inward facing surface;
   a middle section including an inward facing surface that is closer to the axis than the inward facing surface of the top section; and
   a ridge transitioning the inward facing surface of the top section to the inward facing surface of the middle section;
the bag retention frame including an outward facing surface that faces the inward facing surface of the top section of the one or more side walls of the housing when the bag retention frame is in the engaged position.

14. The convertible storage tray and garbage bag holder of claim 13,
wherein, either the outward facing surface of the bag retention frame includes outwardly extending projections, or the inward facing surface of the top section of the one or more side walls of the housing includes inwardly extending projections, or both.

15. The convertible storage tray and garbage bag holder of claim 11,
the one or more side walls of the housing including a top section; and
the bag retention frame including a lip that extends over, and outwardly relative to, the top section of the one or more side walls of the housing, when the bag retention frame is in the engaged position.

16. The convertible storage tray and garbage bag holder of claim 11,
the releasable floor further comprising a floor surface and a side wall extending upward from the floor surface; and in the closed position of the releasable floor, the side wall of the releasable floor partially surrounds the housing and faces the one or more side walls of the housing.

17. The convertible storage tray and garbage bag holder of claim 11 further comprising:
one or more hooks operably connected to the housing, the one or more hooks each including:
an extension portion extending away from the operable connection to the housing to a hook portion;
a first position; and
a second position;
wherein, in the second position the hook portion of the one or more hooks is disposed further away from the housing than in the first position.

18. The convertible storage tray and garbage bag holder of claim 17,
the extension portion of the one or more hooks including a surface that faces the housing when the one or more hooks is in the first position; and
the hook portion of the one or more hooks including a surface that faces the releasable floor when the one or more hooks is in the first position.

19. The convertible storage tray and garbage bag holder of claim 18,
the one or more hooks pivotally connected to the housing about a hook axis that is parallel to the floor axis.

20. The convertible storage tray and garbage bag holder of claim 11 further comprising:
a garbage bag including:
an interior portion disposed within the interior chamber of the housing and extending out of the exit of the interior chamber, with the releasable floor in the opened position; and
an open top portion forming an opening into the interior portion, at least a portion of the open top portion is disposed between the bag retention frame and the housing when the bag retention frame is in the engaged position.

\* \* \* \* \*